(12) United States Patent
Sion

(10) Patent No.: US 10,572,696 B2
(45) Date of Patent: *Feb. 25, 2020

(54) ANTI-TAMPER SYSTEM

(71) Applicant: PRIVATE MACHINES INC., Brooklyn, NY (US)

(72) Inventor: Radu Sion, Brooklyn, NY (US)

(73) Assignee: Private Machines Inc., Brooklyn, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/996,511

(22) Filed: Jun. 3, 2018

(65) Prior Publication Data

US 2018/0276421 A1     Sep. 27, 2018

Related U.S. Application Data

(63) Continuation of application No. 15/553,344, filed as application No. PCT/US2015/067738 on Dec. 28, 2015, now Pat. No. 10,007,811.

(60) Provisional application No. 62/154,640, filed on Apr. 29, 2015, provisional application No. 62/120,480, filed on Feb. 25, 2015.

(51) Int. Cl.
| | |
|---|---|
| *G06F 21/00* | (2013.01) |
| *G06F 21/87* | (2013.01) |
| *G09C 1/00* | (2006.01) |
| *H04L 9/00* | (2006.01) |
| *G06F 21/60* | (2013.01) |
| *G06F 21/62* | (2013.01) |
| *G06F 21/72* | (2013.01) |

| | |
|---|---|
| *H01L 23/00* | (2006.01) |
| *H05K 1/02* | (2006.01) |

(52) U.S. Cl.
CPC ............ *G06F 21/87* (2013.01); *G06F 21/602* (2013.01); *G06F 21/6245* (2013.01); *G06F 21/72* (2013.01); *G09C 1/00* (2013.01); *H01L 23/57* (2013.01); *H04L 9/002* (2013.01); *H05K 1/0275* (2013.01); *H04L 2209/127* (2013.01); *H04L 2209/805* (2013.01)

(58) Field of Classification Search
CPC combination set(s) only.
See application file for complete search history.

(56) References Cited

U.S. PATENT DOCUMENTS

| | | |
|---|---|---|
| 4,811,288 A | 3/1989 | Kleijne et al. |
| 4,860,351 A | 8/1989 | Weingart |
| 5,027,397 A | 6/1991 | Double et al. |
| 5,117,457 A | 5/1992 | Comerford et al. |
| 5,185,717 A | 2/1993 | Mori |
| 5,315,656 A | 5/1994 | Devaux et al. |

(Continued)

FOREIGN PATENT DOCUMENTS

| | | |
|---|---|---|
| EP | 1054316 A1 | 11/2000 |
| EP | 1058178 A1 | 12/2000 |

*Primary Examiner* — Shin-Hon (Eric) Chen
(74) *Attorney, Agent, or Firm* — The Law Office of Daniel T. Weglarz, P.C.

(57) ABSTRACT

The present invention relates to a system for protecting sensitive data including at least one enclosing layer, at least one tamper-detecting sensor, zeroization support logic, at least one memory module, and at least one Internal IPM Decoupler configured to provide a link between the anti-tamper system and at least one electronic component that is enclosed by at least one enclosing layer.

36 Claims, 7 Drawing Sheets

(56) References Cited

U.S. PATENT DOCUMENTS

| | | |
|---|---|---|
| 5,533,123 A | 7/1996 | Force et al. |
| 5,858,500 A | 1/1999 | MacPherson |
| 6,026,293 A * | 2/2000 | Osborn ................. G06F 21/565 |
| | | 455/411 |
| 6,233,685 B1 * | 5/2001 | Smith ..................... G06F 21/33 |
| | | 713/185 |
| 6,396,400 B1 | 5/2002 | Epstein, III et al. |
| 6,512,454 B2 | 1/2003 | Miglioli et al. |
| 6,957,345 B2 | 10/2005 | Cesana et al. |
| 7,005,733 B2 | 2/2006 | Kömmerling et al. |
| 7,054,162 B2 | 5/2006 | Benson et al. |
| 7,256,692 B2 | 8/2007 | Vatsaas et al. |
| 7,281,667 B2 | 10/2007 | Farooq et al. |
| 7,323,986 B2 | 1/2008 | Hunter et al. |
| 7,472,836 B2 | 1/2009 | Farooq et al. |
| 7,791,898 B2 | 9/2010 | Peytavy et al. |
| 7,806,341 B2 | 10/2010 | Farooq et al. |
| 7,898,413 B2 | 3/2011 | Hsu et al. |
| 7,978,070 B2 | 7/2011 | Hunter et al. |
| 8,164,912 B2 | 4/2012 | Tong et al. |
| 8,240,038 B1 | 8/2012 | Pham et al. |
| 8,287,336 B2 | 10/2012 | Dangler et al. |
| 8,321,687 B2 | 11/2012 | Lequere |
| 8,399,781 B1 | 3/2013 | Pham et al. |
| 8,411,448 B2 | 4/2013 | Shi et al. |
| 8,522,051 B2 | 8/2013 | Hankhofer et al. |
| 8,675,875 B2 | 3/2014 | Yellepeddy et al. |
| 8,683,222 B2 | 3/2014 | Yellepeddy et al. |
| 8,687,371 B2 | 4/2014 | Arshad et al. |
| 2001/0033012 A1 | 10/2001 | Kömmerling et al. |
| 2005/0005156 A1 * | 1/2005 | Harper ................. H04L 9/0662 |
| | | 726/26 |
| 2006/0049941 A1 * | 3/2006 | Hunter ................. G01R 22/066 |
| | | 340/545.6 |
| 2006/0059368 A1 | 3/2006 | Fayad et al. |
| 2006/0087883 A1 * | 4/2006 | Ozguz ..................... G06F 21/87 |
| | | 365/185.04 |
| 2006/0225142 A1 * | 10/2006 | Moon ................. G06F 21/6218 |
| | | 726/34 |
| 2008/0000988 A1 | 1/2008 | Farooq et al. |
| 2011/0227603 A1 * | 9/2011 | Leon ..................... H01L 23/576 |
| | | 326/8 |
| 2011/0231932 A1 | 9/2011 | Kimelman |
| 2011/0289324 A1 * | 11/2011 | Yellepeddy ............. G06F 21/79 |
| | | 713/189 |
| 2012/0185636 A1 | 7/2012 | Leon et al. |
| 2014/0108786 A1 | 4/2014 | Kreft |
| 2014/0177842 A1 | 6/2014 | Yellepeddy et al. |

* cited by examiner

ANTI-TAMPER SYSTEM

CROSS-REFERENCE TO RELATED APPLICATIONS

This application is a continuation of co-pending application with Ser. No. 15/553,344 filed in the United States on Aug. 24, 2017, which is the national stage of international application number PCT/US2015/067738 filed on Dec. 28, 2015, which claims the benefit of and incorporates by reference the following United States provisional patent applications: application with Ser. No. 62/120,480, filed in the United States on Feb. 25, 2015; and application with Ser. No. 62/154,640, filed in the United States on Apr. 29, 2015.

FIELD OF THE INVENTION

The present invention generally relates to electronic security devices containing sensitive data and, more particularly, to anti-tamper enclosures.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Furthermore, where a definition or use of a term in a reference, which is incorporated by reference herein, is inconsistent or contrary to the definition of that term provided herein, the definition of that term provided herein applies and the definition of that term in the reference does not apply.

Electronic devices that store sensitive information can easily fall into the wrong hands. To access internally-stored information, malicious parties may mount electronic-based attacks or various physical attacks, including removal of covers, removal of any potting, identification of the location and function of any existing security defenses, or bypassing of such defenses to gain access to the next layer of protection, to name a few.

One solution to this problem known in the art is to provide an anti-tamper system that encapsulates the core processing circuitry (CPC) that performs the system's information processing functionality in a security enclosure. For purposes of this disclosure, the term "anti-tamper" includes tamper resistant, tamper proof, tamper evident, tamper respondent, and the like, or any combination thereof. Throughout this disclosure, the terms "anti-tamper system," "anti-tamper device," and "anti-tamper enclosure" are used interchangeably.

For example, a "tamper-respondent" device may "react" to illicit attacks. Typically, such a device includes the use of a strong physical enclosure and tamper-detection or tamper-response circuitry that zeroes out stored critical security parameters (CSPs) during a tampering attempt, i.e., when the device's security is compromised.

For example, U.S. Pat. No. 4,860,351 A ("Tamper-resistant packaging for protection of information stored in electronic circuitry") discloses a tamper-resistant device that includes apparatus for distributing electro-magnetic energy within a region occupied by the circuit to be protected. A sensing arrangement senses the distribution of the energy, and any changes can be detected, leading to zeroization of the information stored in the protected electronic circuit.

A vast majority of existing anti-tamper devices' information processing functionalities center around cryptographic operations, although a few devices known in the art can perform general-purpose functions, having a general-purpose CPU and RAM included in their CPC.

There exist a number of standards that define the security properties of anti-tamper devices with physical security assurances. For example, the National Institute of Standards and Technology (NIST) issued the Federal Information Processing Standard (FIPS) 140 Publication Series to coordinate the requirements and standards for cryptographic devices that include both hardware and software components. This standard provides four increasing, qualitative levels of security intended to cover a wide range of potential applications and environments. The security requirements cover areas related to the secure design and implementation of a cryptographic device, such as areas related to cryptographic device specification; cryptographic device ports and interfaces; roles, services, and authentication; finite state model; physical security; operational environment; cryptographic key management; electromagnetic interference/electromagnetic compatibility (EMI/EMC); self-tests; design assurance; and mitigation of other attacks.

Specifically, the current standard NIST FIPS 140-2 defines four levels of security, named "Level 1," "Level 2," Level 3," and "Level 4." The highest level, Security Level 4, mandates that the physical security mechanisms provide a complete envelope of protection around the cryptographic device with the intent of detecting and responding to all unauthorized attempts at physical access. Penetration of the cryptographic device's enclosure from any direction must have a very high probability of being detected, resulting in the immediate zeroization of all CSPs.

Security Level 4 also provides for protection of a cryptographic device against a security compromise caused by environmental conditions or fluctuations outside of the device's normal operating ranges for voltage and temperature. An attacker may utilize intentional excursions beyond the normal operating ranges to thwart a cryptographic device's defenses. The standard requires a cryptographic device to either include special environmental protection features designed to detect fluctuations and zeroize CSPs, or to undergo rigorous environmental failure testing to provide a reasonable assurance that the device will not be affected by fluctuations outside of the normal operating range in a manner that may compromise the device's security.

Any security-related properties of an anti-tamper system or its components that aid in the enforcement of the functional security objectives and security requirements mandated by a standard will be referred to as "security properties" throughout this disclosure.

For example, to satisfy the tamper-evidence requirement of FIPS 140-2 Level 2, any physical or logical seals and materials used need to feature tamper-evident properties. These are an example of security properties. As part of these security properties, for example, the security seals commonly employed on devices like electronic voting machines often rely on the irreversible and visible destruction of the seal components.

Further, to satisfy Security Level 4 requirements, the system may need to include an enclosure with tamper-detection and response properties. These, too, are examples of security properties.

Still further, to satisfy the objective of preventing the unauthorized disclosure of any contents of the system, including plaintext cryptographic keys and CSPs, the system and its components may deploy encryption with confidentiality and authentication properties. These are further examples of security properties.

Overall, security properties are any properties required of the system or its components to enforce security as defined in a security policy.

Similar security standards are applied by the US Department of Defense as described in various documents including the "DEPARTMENT OF DEFENSE PHYSICAL SECURITY EQUIPMENT GUIDE" or in the requirements defined by the "DoD Anti-Tamper Executive Agent."

In applying FIPS Publication 140, vendors of cryptographic devices use independent, accredited Cryptographic and Security Testing (CST) laboratories to test their devices. The CST laboratories use the Derived Test Requirements (DTR), Implementation Guidance (IG) and applicable CMVP programmatic guidance to test cryptographic devices against the applicable standards. NIST's Computer Security Division (CSD) and CSEC jointly serve as the Validation Authorities for the program, validating the test results and issuing certificates.

Certification of a system under standards such as FIPS 140-2 often may require the publication of a detailed "security policy." Such security policy is a document that specifies precisely the security rules under which the system must operate, including the security rules dictated by the standard governing the certification (e.g., FIPS 140-2) and any additional security rules imposed by the manufacturer of the system.

A security policy should be expressed in terms of roles, services, cryptographic keys, and other critical security parameters. It should address, at a minimum, an identification and authentication (I&A) policy and an access control policy. An I&A policy specifies whether a system operator is required to identify herself to the system and, if so, what information is required and how it should be presented to the system in order for the operator to prove her identity to the system (i.e., authenticate herself). Information required to be presented to the system might include passwords or individually unique biometric data. Once an operator can perform services using the system, an access control policy specifies what mode(s) of access she has to each security-relevant data item while performing a given service.

The specification should be thorough and detailed enough to define what access operator X, performing service Y while in role Z, has to security-relevant data item K for every role, service, and security-relevant data item included in the system. In other words, the security policy specifies the rules of operation of the system that define the role(s) and circumstances in which an operator is allowed to maintain or disclose each security relevant data item of the system in her performance of a given service.

Standards such as FIPS 140-2 mandate that a system support a number of "authorized roles" for operators of the system. For example, FIPS 140-2 mandates at least a "User" role and a "Crypto Officer" role. The User Role is the role assumed to perform general security services, including cryptographic operations and other approved security functions, as outlined in the security policy. The Crypto Officer Role is the role assumed to perform initialization or management functions (e.g., system initialization, input/output of cryptographic keys and CSPs, and audit functions). The system is often allowed to support other roles or sub-roles. Usually these roles need to be documented in the system security policy. With reference to the various roles described above, this disclosure accepts the definitions of those terms provided in NIST FIPS 140-2.

There are three major reasons for developing and following a precise security policy. Firstly, to induce the vendor of the system to carefully and precisely consider who will be allowed access to the system, the manner in which various system elements can be accessed, and which system elements to protect. Secondly, to provide a precise specification of the cryptographic security properties to enable individuals and organizations (e.g., validators) to determine whether the system, as implemented, obeys (satisfies) a stated security policy. Thirdly, to describe to a system's user (organization or individual operator) the capabilities, protections, and access rights the user will have when using the system.

Today, thousands of manufacturers around the world produce hundreds of billions of computing devices. Many computing devices in use contain personal, financial, legal, health, or other sensitive information, and thus, would greatly benefit from anti-tamper assurances. Yet, despite incredibly frequent reports of security breaches that could have been prevented had some level of security assurance been in place, a vast majority of computing devices do not feature such security properties. In fact, in the years 2013 and 2014, only six devices with Level 4 physical security were certified. Following is a brief overview of various contributing factors that give rise to the overwhelming shortcomings of the prior art.

A primary reason for the phenomenal lack of anti-tamper computing devices is the prohibitively high costs of such devices. For example, in the current state of the art, the latest IBM 4765 cryptographic co-processor featuring a Level 4 security enclosure is priced at approximately $9,250.00.

One of the major reasons for these high costs of anti-tamper devices is their limited production. Rather than being mass-produced, they are almost exclusively designed for niche financial-centric applications in which their significant up-front design and development costs can be justified.

A leading cause for the lack of mass production is the custom nature of the designs. No universal anti-tamper device exists in the prior art that can be mass-produced and is capable of enclosing arbitrary circuitry while providing necessary end-to-end security assurances.

A second compounding reason for the lack of mass production is the inherent inability of existing anti-tamper devices to dissipate significant amounts of heat from within. In addition to contributing to the preclusion of mass production, this heat constraint further burdens the prior art in that it necessarily constrains the size and, thus, the performance capabilities and computation power of the protected circuitry within such a device.

A third and principal reason for the lack of mass production stems from the nature of the design, build, and certification processes that are involved in providing a device that meets accepted security standards. Such processes are extremely time-consuming and costly. Further, new end-to-end certification of an entire device is often required for even minor changes in its design. By the time any anti-tamper computing device can be made commercially available, its internal CPC has already become obsolete for most general purpose computing tasks beyond use in the niche applications for which it was designed, i.e., applications in which the internal cryptographic hardware maintains its advantage.

Ultimately, these obstacles derive from the tightly-coupled nature of the design and R&D processes associated with anti-tamper devices. Currently in the art, the internal processing capabilities of such a device are tightly and directly coupled with the device's design and R&D processes. For example, manufacturers necessarily custom-design internal CPC for each individual device. Moreover, in all known device designs, the internal CPC; the anti-tamper enclosure elements, such as circuitry, sensors, potting, and flexible meshes; as well as any internal cryptographic circuitry, are all tightly integrated, both logically and physically.

Thus, there exists in the prior art a great need for an invention that seeks to address these issues. It is among the objects of the present invention to obviate or mitigate these disadvantages in the field.

SUMMARY OF THE INVENTION

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

The present invention is related to a system with anti-tamper properties and decoupled architecture. Such a system may be used to protect sensitive information stored in an electronic device.

There is thus provided in accordance with a preferred embodiment of the present invention a device for containing sensitive data including at least one enclosing layer, a cryptography module, at least one tamper-detecting sensor, zeroization support logic, at least one memory module, and at least one Internal IPM Decoupler configured to provide a link between the anti-tamper system and at least one electronic component that is enclosed by at least one enclosing layer. Additionally or alternatively, the at least one memory module includes a battery-backed memory module.

Preferably, the anti-tamper system is compatible with an information processing module, which may include a standard or proprietary central processing unit. The Internal IPM Decoupler may comprise an internal power connector. Preferably, the device includes at least one power supply port, at least one of which may include a battery connection socket. The device preferably also includes a reset module.

In a preferred embodiment, the device is further configured such that the at least one enclosing layer can be opened and an electronic component can be disconnected from the Internal IPM Decoupler and replaced with another, of the same or a different type such that the anti-tamper system possesses a specified set of security properties both before and after such interchange of electronic components.

In accordance with a preferred embodiment, the device is configured to trigger zeroization upon tampering. The device may be configured to enable replacing an information processing module or cryptography module without zeroizing the system upon receiving and authenticating a message. The present invention further provides an anti-tamper system configured such that its design may be reused in conjunction with various information processing modules or cryptography modules. According to an embodiment, the device comprises guidance circuitry. According to another embodiment, the device comprises digital signal processing circuitry.

Various objects, features, aspects, and advantages of the present invention will become more apparent from the following detailed description of preferred embodiments of the invention, along with the accompanying drawings in which like numerals represent like components. These objects, features, aspects, and advantages are indicative, however, of but a few of the various ways in which the principles of the invention may be employed and the subject invention is intended to include all such objects, features, aspects, and advantages and their equivalents. Other advantages and novel features of the invention may become apparent from the following detailed description of the invention when considered in conjunction with the drawings.

BRIEF DESCRIPTION OF DRAWINGS

A more detailed understanding of the invention may be had from the following description of a preferred embodiment, given by way of example and to be understood in conjunction with the accompanying drawings wherein, like reference numbers represent corresponding parts throughout.

DETAILED DESCRIPTION OF THE INVENTION

The ensuing description provides preferred exemplary embodiments only, and is not intended to limit the scope, applicability, or configuration of the disclosure. Rather, the ensuing description of the preferred exemplary embodiments will provide those skilled in the art with an enabling description for implementing preferred and exemplary embodiments of the disclosure. It is apparent to a person of ordinary skill in the art, however, that the present invention may be practiced through many embodiments other that those illustrated. It should be understood that various changes may be made in the function and arrangement of elements without departing from the spirit and scope of the invention as set forth in the appended claims. Well-known circuits and cryptographic techniques are not set forth in detail in order to avoid unnecessarily obscuring the present invention.

Figure 1:
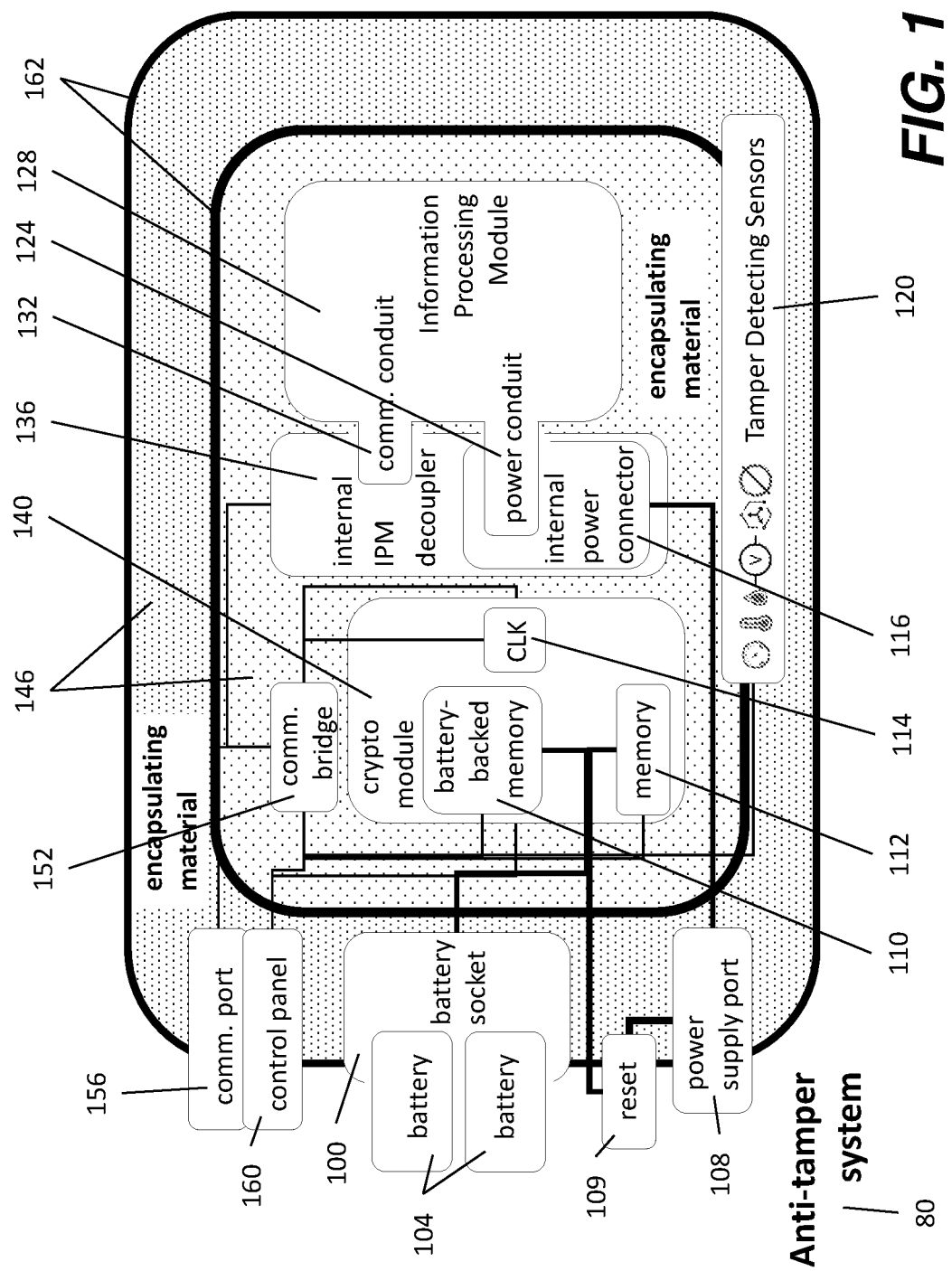
FIG. 1 is a schematic diagram of the anti-tamper system according to an embodiment of the present invention.

Reference will now be made in detail to the preferred embodiments illustrated in the accompanying drawings. FIG. 1 illustrates a schematic diagram of an anti-tamper system (or system) 80. Throughout this disclosure, the terms "anti-tamper system," "anti-tamper device," and "anti-tamper enclosure" are used interchangeably.

In one embodiment, the anti-tamper system 80 makes use of a universal, general-purpose anti-tamper enclosure design comprising one or more enclosing layers 162. An enclosing layer 162 may provide a physical encasing, such as a strong protective shell, that surrounds other portions of the system 80. An enclosing layer 162 may enclose a layer of encapsulating material 146. Various system 80 components or circuitry may be embedded within or built into the encapsulating material 146. In a preferred embodiment, each enclosing layer 162 encloses a corresponding layer of encapsulating material 146.

In one embodiment, the enclosing layer 162 is a specially designed enclosure formed from machined aluminum AL 6061. The encapsulating material 146 may comprise a special resin potting or epoxy, such as the S7527 or S7302 special resins or the Kryptos 17 potting.

In one embodiment, the system 80 may comprise a plurality of enclosing layers 162 may be nested, one within another, effectively constituting an "onion" of enclosing layers 162. The system 80 may further comprise an encapsulating material 146 between any two such enclosing layers 162. Different enclosing layers 162 may be formed from different materials or combinations of materials, which may be hard or soft. Different instances of encapsulating material 146, such as those enclosed by different enclosing layers 162, may likewise be comprised of different materials or combinations of materials.

In one embodiment, individual enclosing layers 162 and layers of encapsulating material 146 may each be fitted with different tamper-detecting, tamper-respondent, or other anti-tamper capabilities, including different types of tamper-detecting sensors 120 and different types of zeroization support logic 316. For example, a first enclosing layer 162 may provide a physical-penetration detection capability using an electro-capacitive or impedance-altering conductive foil sensor, whereas a second enclosing layer 162 may comprise a mesh of temperature sensors embedded in thermally conductive adhesive. Likewise, a first layer of encapsulating material 146 may comprise different anti-tamper properties than a second layer of encapsulating material 146. Furthermore, an enclosing layer 162 may comprise the same or different anti-tamper properties compared to a layer of encapsulating material 146.

As depicted in the figures, a preferred embodiment of the anti-tamper system 80 may comprise at least one tamper-detecting sensor 120. A tamper-detecting sensor 120 includes any sensor deployed in the context of securing an anti-tamper design, including sensors known in the art and proprietary designs. For example, the tamper-detecting sensor 120 may include a sensor configured to detect, relative to a predefined range, changes in temperature, mechanical pressure, atmospheric pressure, radiation, voltage, UV, impedance, electrical current, or any other system or environment property. The tamper-detecting sensor 120 may also comprise an intrusion detection circuit. Any number of tamper-detecting sensors 120, of the same or differing types, may be embedded in any given enclosing layer 162 or encapsulating material 146.

In one embodiment, the tamper-detecting sensor is composed of a single or multi-layer FlexPCB or a silver-ink dielectric combination printed circuitry bound to one or more enclosing layers using heat-cured epoxy such as the 3M AF 163-2 or the Henkel EA 9696 adhesive films. Other embodiments of the tamper-detecting sensor may include: a light sensor, such as the Rohm Semiconductor BH1603FVC-TR; a temperature sensor, such as the Microchip Technology MCP9701T-E/LT; a microphone sensor, such as the CUI Inc CMA-4544PF-W; and a vibration sensor, such as the TE Connectivity 1-1002608-0. Multiple sensors may be connected using a multiplexer, such as the Vishay DG4051AEQ-T1-E3.

Any tamper-detecting sensor 120 may include an output port (pin), an input port (pin), or both, connecting to one or more other components of the anti-tamper system 80 to form a closed circuit. By means of such connections, a tamper-detecting sensor 120 may be configured to monitor one or more connections and detect an intrusion by detecting a disconnected or shorted circuit; a change in temperature, voltage, or resistance outside the predefined range; or any combination thereof. In one embodiment, at least one tamper-detecting sensor 120 may connect directly to a cryptography module 140 or to other circuitry of the system 80.

Figure 2:
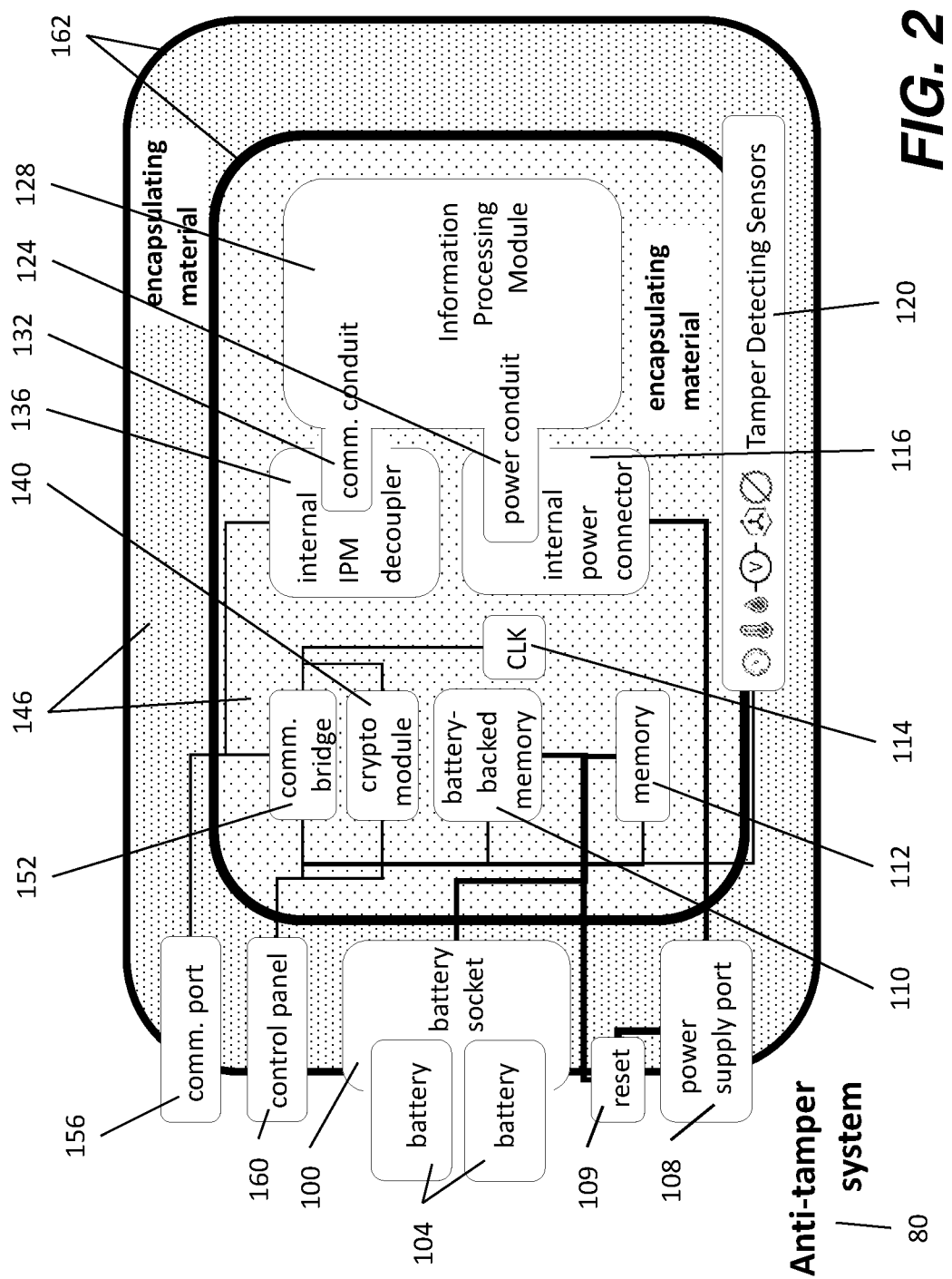
FIG. 2 is a schematic diagram of another embodiment of the anti-tamper system.

In one embodiment, the system 80 may include at least one memory module 112 configured to store information. Memory module 112 may be any circuitry configured to contain information, such as SRAM, DRAM, FLASH, ROM, PROM, EPROM memory chips, communication buffers, communication conduits, and other alternatives known in the art. A memory module 112 may be internal to a cryptography module 140 as shown in FIG. 1, or external to the cryptography module as shown in FIG. 2.

At least one memory module 112 may be a battery-backed memory module 110. The system 80 may include any number of memory modules 112 and battery-backed memory modules 110, including none at all. For the purposes of this disclosure, a battery-backed memory module 110 is a type of memory module 112 that is configured to be connected to a battery. Some or all of memory module 112 and battery-backed memory module 110 may be connected to a general circuitry main power supply of the system. The battery-backed memory module 110 may be configured to preserve any data stored in it, even after main power is removed. A battery-backed memory module 110 may be used for storing information that needs to be preserved across transitions between multiple customers, parties, vendors, and the like, or during periods when the system does not have access to its main power supplies. A battery-backed memory module 110 may be internal to the cryptography module 140 as shown in FIG. 1, or external to the cryptography module as shown in FIG. 2.

Any memory module 112 or battery-backed memory module 110 may be a zeroizable memory module. A zeroizable memory module is a type of memory module 112 or battery-backed memory module 110 that contains or is tightly integrated with zeroization support logic 316. Zeroization support logic (ZSL) 316 is any means, including materials, hardware, software, firmware, or any combination thereof, configured to aid in the process of zeroization.

For the purposes of this disclosure, zeroization refers to a process of obliterating, destroying, or otherwise impairing information contained within any component or circuitry of system 80, including memory chips, communication buffers, communication conduits, or any other element of the invention. Zeroization may include physically destructive means, physically non-destructive means, or both. For example, zeroization of a zeroizable memory module may be accomplished in a physically destructive manner by causing a high-voltage current to travel through the memory cells. Further, zeroization of a zeroizable memory module may be accomplished in a physical non-manner, such as by disabling the self-refresh mechanism of DRAM, setting all bits to a known value.

For both physically destructive and non-destructive zeroization, ZSL 316 may be necessary. ZSL 316 may be internal or external to any component of system 80. As alluded to above, ZSL 316 may include DRAM refresh firmware configured to disable its self-refresh mechanism. As another example, ZSL 316 may include an electrical conduit configured to feed high-voltage current to a zeroizable memory module or other component. Further examples include a combustibly destructive microelectronic circuit board interconnection, or a sheet of pyrofuse foil as disclosed in U.S. Pat. No. 4,860,351 A ("Tamper-resistant packaging for protection of information stored in electronic circuitry"). One skilled in the art would recognize many other forms of ZSL, any of which may be implemented in the present invention.

The anti-tamper system 80 may also comprise a clock ("CLK") 114. The clock 114 may comprise hardware, software, firmware, or some combination thereof, that implements a notion of global event ordering or time—a measure by which events may be ordered from the past through the present into the future, and may also measure the durations of events and the intervals between them. A clock 114 may be as simple as a continuously incrementing counter, or as complicated as a full-fledged real time clock and calendar. One skilled in the art would recognize a variety of types of clocks and counters that would lend themselves to use as the clock 114 in system 80, and their respective implementation in the present invention.

The use of clocks in computing is well known in the art. For example, in one embodiment, the clock 114 may be used in time-stamping communication between internal components of system 80, or between a third party 416 and internal components. The clock 114 may be internal to the cryptography module 140 as shown in FIG. 1, or external to the cryptography module as shown in FIG. 2. In one embodiment, the clock 114 may be connected directly to the cryptography module 140 or to other internal circuitry of the system 80.

The cryptography module 140 may be included in a preferred embodiment of the invention. The cryptography module (crypto module) 140 may comprise hardware, software, firmware, or some combination thereof, configured to implement cryptographic logic or cryptographic processes, including cryptographic algorithms and functions, such as asymmetric and symmetric key encryption, cryptographic hash functions, the generation of random numbers, and other cryptographic logic or processes known in the art. Crypto module 140 may be of a type known in the art or of a proprietary type. Crypto modules known in the art often include additional features, such as internal FLASH memory, tamper-respondent designs, battery-backed memory, and real-time clocks. Examples of crypto modules known in the art include the MAXQ1850 DeepCover Secure Microcontroller with Rapid Zeroization Technology and Cryptography, and the MAX32550 DeepCover Secure Cortex-M3 Flash Microcontroller.

FIG. 1 depicts an embodiment of the system 80 in which a memory module 112, a battery-backed memory module 110, and a clock 114 are situated internal to the crypto module 140. To the contrary, FIG. 2 illustrates an embodiment of system 80 in which the memory module 112, battery-backed memory module 110, and clock 114 are situated external to the crypto module 140.

Figure 3:
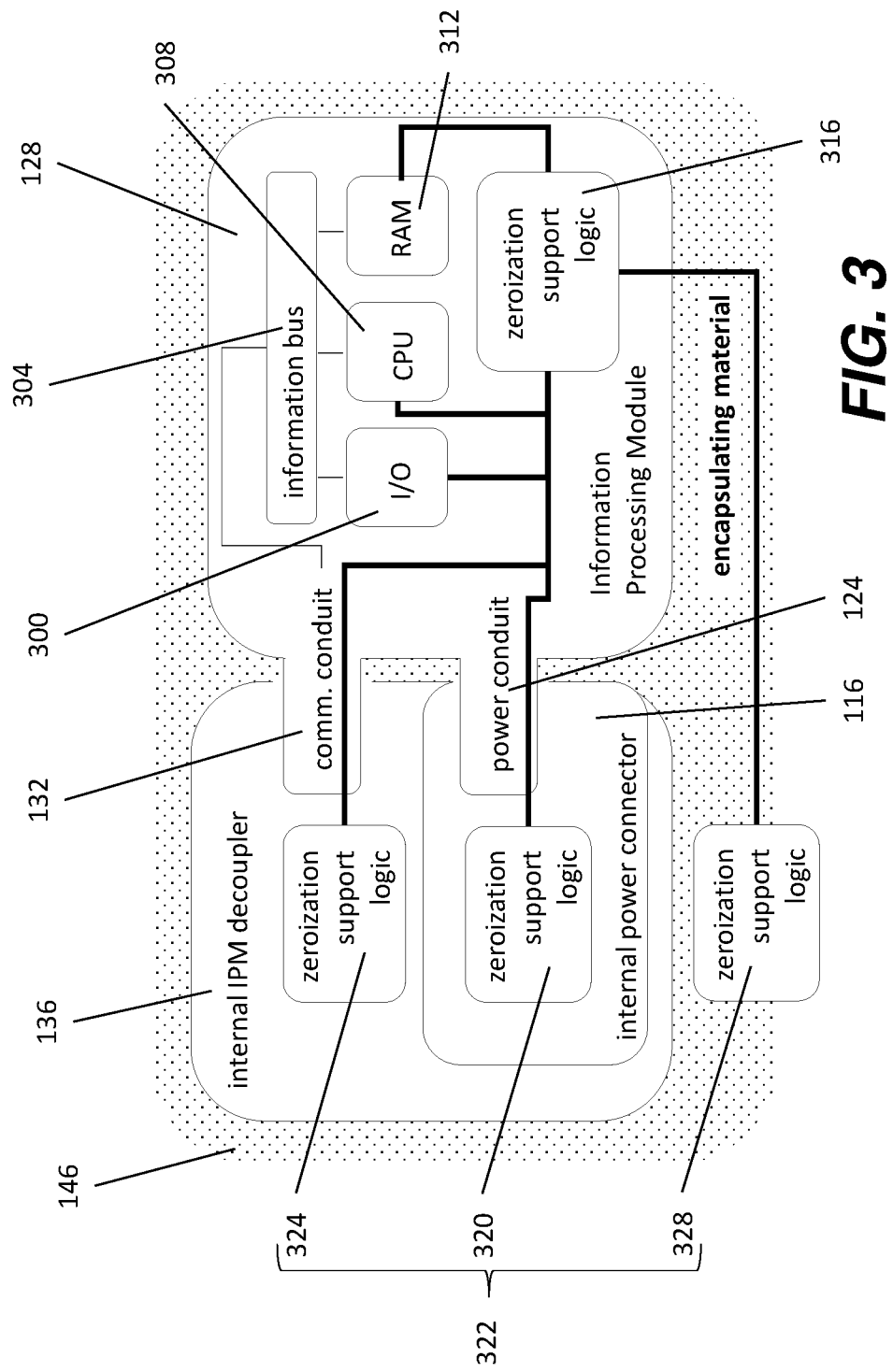
FIG. 3 is a schematic diagram of another embodiment of the anti-tamper system.

The anti-tamper system 80 may be adapted to receive an information processing module 128 and utilize the information processing functionality provided by such information processing module. FIGS. 1, 2, and 3 illustrate embodiments of system 80 with an information processing module (IPM) 128 connected. For purposes of this disclosure, an IPM 128 is a module that may receive inputs, such as those of a digital or analog nature; compute a digital, mathematical, mechanical, or signal processing function; and produce outputs, such as those of a digital or analog nature. An IPM 128 may contain circuitry configured to provide a desired information processing functionality of the system 80. Conceptually, the IPM 128 may represent a modular instance of a subset of the CPC of a system 80. As depicted in FIG. 3, the IPM 128 may comprise an information bus 304, input-output circuitry 300, a central processing unit 308, a memory module 312, and zeroization support logic 316. As used in this disclosure, the "connection status" of an electrical component, such as the IPM 128, refers to whether the component is electrically connected or not connected to the anti-tamper system 80. For example, an electronic component electrically connected to the system has a "connected" connection status, while alternatively, when the component is not electrically connected to the system, the component has a "not connected" connection status.

In a preferred embodiment, the IPM 128 is not considered part of the anti-tamper system 80. Rather, the system 80 of such embodiment is configured to receive at least one IPM 128, which is considered an independent component capable of utilization by the system. However, while not considered part of the system 80 in this embodiment, at least one IPM 128 may be built into and sealed within the system during manufacture. Other components may be comprised by a system's 80 core processing circuitry CPC, yet be outside of the IPM 128. Examples include cryptographic circuitry, sensors, and zeroization support logic. These components may be considered part of the system 80 and, permanently built into the device during manufacture.

Various types of information processing modules are known in the art. An IPM 128 may comprise one or more central processing units (CPUs) 308, memory, input/output circuitry 300, communication conduits, RAM 312, or a number of additional support circuitry. Examples of such IPMs 128 include computers, laptops, credit-card-sized "mini" computers such as the Raspberry Pi, Arduino, Banana Pi, and BeagleBone, and digital signal processing modules. The CPU 308 may be of a standard off-the-shelf architecture, such as x86 produced by Intel and AMD; ARM produced by HP, Samsung, and Qualcomm; or PowerPC produced by IBM, Microsoft, Sony, Toshiba, and Freescale. Alternatively, the CPU 308 may be of a custom design.

An IPM 128 may be built from mass-produced components familiar in the smartphone and general mobile/ARM markets, such as an ARM Cortex-derived smartphone system on chip (SoC), the Raspberry Pi, Arduino, Banana Pi, and BeagleBone, and the Samsung Exynos ARM SoC, or it may be of a custom design. One or more of any IPM 128 used in system 80 may include guidance circuitry, such as avionics guidance circuitry, naval guidance circuitry, satellite guidance circuitry, missile guidance circuitry. Additionally or alternatively, any IPM 128 may include non-guidance circuitry, including digital signal processing (DSP) circuitry, such as the off-the-shelf Texas Instruments Ultra-lower Power DSP system on chip.

A system on chip (SoC), as referred to in this disclosure, may comprise an integrated circuit that integrates all components of a computer or other electronic system into a single chip. It may contain digital, analog, mixed-signal, or radio-frequency functions, all of which may be situated on a single chip substrate. SoCs are common in the mobile electronics market also because of their often low power consumption. A typical application is in the field of embedded systems.

Some key insights with regard to the certification of anti-tamper devices are provided here to shed light on the design of the present invention. Anti-tamper system hardware design paradigms have not advanced significantly in the prior two decades. Research and development (R&D) and production cycles are long, expensive, and largely targeted at custom deployments of anti-tamper systems with single one-time use applicability. As a result, available designs often become obsolete by the time they can be made commercially available. Further, they are virtually impossible to update or reuse for new deployments without significant additional expenditure.

These limitations are related to the costly and long R&D cycles of known anti-tamper enclosures, which are custom-designed for each deployment. Yet, while anti-tamper enclosure designs improve relatively slowly and somewhat linearly in time, the relative performance of internal circuitry, i.e., the core processing circuitry (CPC), such as CPU and DRAM chips, are advancing rapidly. Hence, the performance of the CPC utilized with known anti-tamper devices is depreciating exponentially relative to the mainstream "outside" off-the-shelf chips. This opens a significant disruptive opportunity, which the present invention seeks to leverage: separating the expensive research, design, and development cycle of the tamper-proof enclosure from the internal CPC.

Doing so may: (i) maximize operational benefits of expensive investments in enclosure designs; (ii) minimize the costs of designing and deploying new high-performance anti-tamper devices; (iii) drastically reduce the amount of time required to design and deploy new high-performance anti-tamper devices, possibly to within months as opposed to years; (iv) standardize critical enforcement mechanisms and properties of anti-tamper devices; and (v) provide anti-tamper assurances to virtually any and all off-the-shelf circuitry. There exists in the art a great want for a solution that provides for the above benefits.

A deeper analysis of the certification processes discussed earlier in this disclosure reveals further insights that help give life to the present invention. More specifically, all certification programs rely on a number of underlying trust assumptions. These assumptions render certification a trust partnership between the vendor, the testing laboratory, and the certification authority.

For example, FIPS 140-2, a major current anti-tamper certification standard, works as follows. A security policy document, provided by the device's vendor, describes the behavior of the certified device and its interaction with the outside world. The vendor then works with the CST laboratory to ensure that the device's functions and behaviors advertised in the policy are indeed capable of being correctly and securely performed. The validation authority is then provided with written certification and testing assessments by the laboratory, based on which the validation authority determines whether to grant or deny certification.

However, the certification process specifically cannot and does not inspect most of the device's internal hardware and circuitry. With today's chips being composed of four to ten billion transistors each, this would be simply prohibitive in time and cost. Instead, the certification authority broadly assumes a certain level of trustworthiness of any of the internal circuitry, microcode, and hardware layout. This is the case especially for off-the-shelf components, such as CPUs, support chipsets, and memory modules.

Moreover, certification implies no manufacturing-stage verification. Anti-tamper device manufacturing and delivery is assumed to be performed in a manner compatible with the security specification.

Overall, effectively, security certification processes constitute a security design guidance and testing resource for an essentially trusted vendor. This trust is a crucial component to any anti-tamper certification.

Hence, the current certification process leaves much room for an invention that leverages the inherent gaps in the process that result from the certification authority's calculated reliance on vendor trust. The present invention seeks to capitalize on this insight by providing a new anti-tamper system that focuses on satisfying the essential security assurances required of known certification standards, while providing any additional functionality desired of the system in a manner that takes maximum advantage of the vendor trust intrinsic to the certification process.

Thus, it is an objective of the present invention to provide a new anti-tamper system 80 with a decoupled IPM 128. For the purposes of the present description and claims, the term "decoupling" includes a combination of both physical decoupling and logical decoupling. Logical decoupling is defined to include creating independence, in one or more aspects, between an anti-tamper system's research and development and at least one design feature of such system, or between the certification process and at least one design feature of the system. For instance, in decoupling the IPM 128 from the anti-tamper system 80, the anti-tamper system's R&D and certification processes can be performed independent of the selection of the type of IPM 128 that the system will ultimately utilize. It is a further objective to provide such a system that is further capable of maintaining the security assurances essential to an anti-tamper design under known standards. Such essential assurances may include the ability to convince outside parties that a trusted vendor produced the device, that the device has not been tampered with, or both.

Importantly, a device that has been tampered with should not be capable of claiming that it has not been tampered with. Technically, tamper-respondent enclosures are generally expected to correctly respond to tampering by zeroizing CSPs, and, once tampered-with, ensure tamper-evidence.

Core assurances are what the associated security policy would specify and the certification process would certify. Then, a key insight that allows for a decoupled design is that, to guarantee end-to-end security, a tight logical or physical coupling between the internal CPC and any other components of the anti-tamper system, including any internal cryptographic circuitry, is not required. As long as the anti-tamper system provides the above assurances, a trusted vendor may change the internal CPC used with the system, without otherwise modifying the system.

In fact, decoupling the design and implementation of an anti-tamper system from the internal CPC and any internal cryptographic circuitry, allows a secure and cost-effective design in which the CPC and possibly the internal cryptographic circuitry may be mass-produced off-the-shelf components.

Further, anti-tamper system design lifecycles are significantly longer than that of the CPC they employ. The latter may be governed by "Moore's Law"—the observation that, over the history of computing hardware, chip performance doubles approximately every eighteen months, or alternately, the number of transistors in a dense integrated circuit doubles approximately every two years. In contrast to Moore's Law, which results in existing chips being quickly obsoleted and hardware design cycles being measured in months, anti-tamper system design cycles are measured in years.

The decoupled design contemplated by the present invention may also allow vendors to benefit from existing off-the-shelf, low-power technology, such as ARM system on chip technology, available in the mobile market field. Low-power technology has the additional benefit of dissipating less heat. This would allow vendors to include significantly more functionality within heat-constrained anti-tamper systems. For example, existing anti-tamper systems, such as the IBM 4765 PCIe cryptographic coprocessor, consumes up to 23.44 W (up to 80% of which may be dissipated as heat) and feature outdated 32 bit 405D RISC PowerPC processors designed decades ago. In contrast, a typical modern smartphone ARM SoC consumes 2-5 W and is tens of times more performant.

The decoupled design of the present invention provides an anti-tamper system 80 that may be certified independently of any information processing module 128. It further allows for the system to be compatible with, and capable of utilizing the information processing functionalities of, a wide variety of types of information processing modules 128, including standard existing types. Such an anti-tamper system 80 may provide a specified set of security properties irrespective of the type or types of IPM 128 that the system is configured to utilize. For example, this specified set of security properties may be the National Institute of Standards and Technology Federal Information Processing Standard Publication 140 Security Level 1, Level 2, Level 3, or Level 4; the security standards defined by the United States Department of Defense Anti-Tamper Executive Agent or Physical Security Equipment Guide; or other existing standards that define sets of security properties.

The NIST FIPS Publication 140 standard is reviewed for revision periodically, and has multiple versions. For instance, version 140-1 has been superseded by version 140-2, to accommodate the FIPS Publication 140 standard's application to new technology, while maintaining the original spirit of the standard. The FIPS Publication 140 standard will likely see many revisions throughout its existence. The current invention anticipates that FIPS Publication 140 may expand to include additional security levels, e.g., Security Level 5. The specified set of security properties referred to throughout this disclosure's description and claims may comprise the security requirements defined by any security level of any version of the FIPS Publication 140 standard. When referring to the FIPS Publication 140 standard in the claims of this disclosure, such references are to be understood to encompass any version of the standard and such references are not to be interpreted as limiting such claims' application to any particular version of the FIPS Publication 140 standard.

Still further, the decoupled design of the present invention provides the system 80 with the capability to have any connected IPM 128 replaced by a new IPM of the same type, switched with an alternative IPM, or upgraded to a newly designed IPM that did not yet exist at the time of the R&D, design, or manufacturing phases associated with the system. As discussed below, this may be performed such the system 80 possesses a specified set of security properties both before and after such interchange of the IPM 128.

Anti-tamper system designs currently known in the art, in conjunction with existing certification methodologies, inherently stifle the furtherance of computing capabilities of such systems and preclude the exploitation of potentially available levels of computing technology. To the contrary, the present invention provides a new anti-tamper system that can truly harness rapidly advancing CPC technology.

Overall, the decoupled design contemplated allows for replacing the internal CPC components, i.e., the IPM 128, frequently while maintaining a certified anti-tamper system design in place long term. This will finally enable the computing power and functionality of anti-tamper systems to keep pace with CPC technology, all without affecting the security of such systems. Further, it effectively amortizes the expensive and time-consuming one-time certification-related research, development, and certification costs over a larger number of devices utilizing the same design with different information processing circuitry.

Referring to FIGS. 1, 2, and 3, a preferred embodiment of the anti-tamper system 80 comprises an Internal IPM Decoupler 136 configured to connect with, such that the anti-tamper system 80 may utilize the functionality of, at least one electronic component, and physically decouple such electronic component from the anti-tamper system 80, and logically decouple such component from the R&D or certification of the system 80. Examples of such electronic component include an IPM 128 and a cryptography module 140. For instance, in one embodiment, the Internal IPM Decoupler 136 is configured to provide a modular design of anti-tamper system 80 such that, as discussed at length above, a different or higher-performing IPM 128 may be utilized by the system 80, even as the system's design is updated, and without requiring recertification or additional system redesign.

Further, the modular system design provided by the Internal IPM Decoupler 136 may also provide the anti-tamper system 80 compatibility with a plurality of IPM 128 designs. For example the system 80 design may utilize a general-purpose computation IPM 128 or an analog signal processing IPM 128 comprising digital signal processors (DSP) and associated circuits.

Elements of the anti-tamper system 80 may undergo thorough testing and certification independent of the selection of the type of IPM 128 that the system 80 will ultimately utilize. This enables the information processing functionality of the system 80 to be selected subsequently. The selected information processing functionality may then be provided by simply connecting a corresponding IPM 128 with the Internal IPM Decoupler 136, thus installing the IPM in the system 80. Such installation of a desired IPM 128 may occur prior to the system 80 being physically sealed and delivered to a customer.

In one embodiment, the Internal IPM Decoupler 136 may comprise a port of a type known in the art, such as DVI, HDMI, USB, or Ethernet. Or, a custom-designed Internal IPM Decoupler 136 may be utilized, such as one with reinforced electrical conduits for a USB connector that enables it to carry higher voltages and higher currents than otherwise possible. In a preferred embodiment, the Internal IPM Decoupler 136 is configured such that an IPM 128 may easily be "plugged in" at the factory, before the system 80 is physically sealed.

Referring to FIGS. 1, 2, and 3, the anti-tamper system 80 may comprise an internal power connector 116 configured to supply power to the system 80 or an IPM 128. In one embodiment, the Internal IPM Decoupler 136 and the internal power connector 116 may be structurally linked, situated within each other, or both. FIGS. 1 and 3 depict an embodiment in which the internal power connector 116 is situated within the Internal IPM Decoupler 136. FIG. 2 illustrates an internal power connector 116 that is structurally separate from the Internal IPM Decoupler 136.

In cryptography, power analysis is an attack in which the attacker studies the power consumption of a cryptographic hardware device (such as a smart card, tamper-resistant "black box," or integrated circuit) with the goal of extracting cryptographic keys and other secret information from the device.

In one embodiment, the internal power connector 116 and the Internal IPM Decoupler 136 may comprise defenses against differential power analysis attacks. For example, the power circuitry may be designed so as to ensure a power draw that is unrelated to the internal processing or data contained within. This can be achieved by numerous means, including a simple two-capacitor scheme in which external power charges two capacitors in turn and the internal circuitry only powers up from one of the capacitors that is not currently being charged, thus separating power consumption from power delivery. Further, low-pass electrical filters can be placed on any power-related conduits to prevent egress of any sensitive internal signals.

The anti-tamper system 80 may further comprise an external power supply port 108. The power supply port 108 may be of a standard existing type, such as a coaxial power connector, a Molex connector, Tamiya connector, or SAE connector; or of a custom design. In one embodiment, the power supply port 108 may be structurally connected with an external communication port 156. In an alternate embodiment, the power supply port 108 and the external communication port 156 may be structurally separate, as shown in FIG. 2.

In one embodiment, the system 80 may use the external power supply port 108 or other components to allow wireless or contactless power delivery in which power is provided without a physical connection to an external power source, such as by using electromagnetic radiation or induction principles.

In an embodiment, the anti-tamper system 80 may comprise an external battery connection socket 100 configure to receive one or more batteries 104. Such batteries 104 may be of a standard existing type, such as D, C, AAA, AA, CR2/3A, CR1/2AA, and CR123A, or of a custom design.

In one embodiment, the anti-tamper system 80 is configured such that removing or otherwise disconnecting any or all batteries 104 is perceived by the system as a tampering attempt. In this manner, the system may require connection with at least one battery 104 to provide a power source for the battery-backed memory module 110. Disconnecting all batteries 104 may perturb proper functioning of the system 80.

In one embodiment, the battery connection socket 100 may connect at least two batteries 104, each of which alone is sufficient to provide the necessary amount of power required by the system 80. Having at least two batteries 104 may allow replacing a used battery, which may be swapped with a replacement, while the other battery continues to provide the necessary battery power.

In one embodiment, the battery connection socket 100 and associated circuitry includes charging circuitry for rechargeable batteries so as to ensure optimal battery levels throughout the lifetime of the system 80.

Further, the battery connection socket 100 and associated circuitry may also comprise a capacitor or energy source configured to provide power to the system circuitry during battery 104 replacement. In this case, a single-battery design may be sufficient.

A preferred embodiment of system 80 may comprise a communication port 156 configured to provide an interface between the system 80 and external devices. The communication port 156 may be externally accessible, i.e., from outside the system 80. Typical known uses of communication ports include connecting a computer to a monitor, webcam, speakers, or other peripheral device. On the physical layer, a communication port may be a specialized outlet configured to receive a plug or cable. Electronically, conductors where port and cable contacts connect may provide means to transfer signals between devices. The communication port 156 may be of a standard existing type, such as PCIe, serial, parallel, DVI, HDMI, USB, Ethernet, DIMM, and SODIMM, or of a custom design.

The communication port 156 may also be comprised of a wireless communication module that does not require physical connection with external devices to function.

A preferred embodiment of system 80 may comprise a communication bridge 152. A communication bridge 152 may comprise hardware, software, firmware, or some combination thereof, configured to interconnect a plurality of digital or analog devices. A simplistic example of a communication bridge is a simple electrical conduit, while more complex designs include traditional bus or hub architectures. The communication bridge 152 provides means for components of the system 80 to communicate with each other or with an external device. In one embodiment, the communication bridge 152 interconnects any or all of the following: the sensors 120, the Internal IPM Decoupler 136, the crypto module 140, the memory module 112, the battery-backed memory module 110, and the externally-accessible communication port 156.

In one embodiment, the IPM 128 may comprise a power conduit 124, which may be configured to connect to the internal power connector 116. The power conduit 124 and the internal power connector 116 may be structurally linked, as depicted in FIGS. 1, 2, and 3; situated one within the other; or both. In one embodiment, the power conduit 124 serves as a means for the IPM 128 to draw power from the internal power connector 116 and distribute the power to the IPM 128 components.

In an embodiment, the IPM 128 may comprise a communication conduit 132, which may be configured to connect to the Internal IPM Decoupler 136. In one embodiment, the communication conduit 132 serves as a means for the IPM 128 to communicate with other components of the system 80, such as the communication bridge 152 and the crypto module 140, by connecting through the Internal IPM Decoupler 136.

In one embodiment, internal circuitry, including the Internal IPM Decoupler 136, the IPM 128, the communication bridge 152, the crypto module 140, memory module 112, battery-backed memory module 110, and the clock 114, may be contained within at least one enclosing layer 162 or encapsulating material 146.

In an embodiment, an IPM 128 may include zeroization support logic (ZSL) 316, which may connect with ZSL external to the IPM, such as ZSL 320 part of the internal power connector 116, or ZSL 324 part of the Internal IPM Decoupler 136. Moreover, any component of the anti-tamper system 80 may be fitted with some form of ZSL. The ZSL in any component may cooperate with the ZSL in any component or components.

In one embodiment, zeroization support logic such as the ZSL 316 part of the IPM 128, ZSL 320 part of the internal power connector 116, ZSL 324 part of the Internal IPM Decoupler 136, or ZSL 328 residing in an enclosing layer 162 or encapsulating material 146 may include an electric charge capacitor, a reinforced electrical conduit configured for transportation of high-voltage current to a zeroizable memory module to be zeroized, a combustibly destructive microelectronic circuit board interconnection, a sheet of pyrofuse foil that may be electrically activated, or other forms of ZSL known in the art.

In an embodiment as depicted in FIG. 3, separate ZSL 328 may reside in any enclosing layer 162 or encapsulating material 146 of the enclosure 80. The ZSL residing in a layer 328 may be configured to connect with the communication bridge 152 or other system components.

The crypto module 140 may aid in zeroization of any component of the system 80. For example, in one embodiment, the tamper-detecting sensors 120 are connected to the crypto module 140. When the crypto module 140 becomes aware of a tamper event through communication with the tamper-detecting sensors 120, the crypto module instructs the zeroizable memory module 112 to zeroize. The crypto module 140 may also connect to the Internal IPM Decoupler 136, the internal power connector 116, the ZSL within the Internal IPM Decoupler 324, the ZSL within the internal power connector 320, the ZSL 328 within an enclosing layer 162 or encapsulating material 146, or any combination thereof, and request zeroization.

In one embodiment, the crypto module 140 may be further configured to control the electrical signals pertaining to the Internal IPM Decoupler 136, the internal power connector 116, the communication bridge 152 and other internal components. For example the crypto module 140 may be configured to turn on or off the IPM 128 either based on a certain pre-defined condition, such as an electrical assumption being violated, or dynamically as directed by specialized firmware running inside the crypto module. Further, the crypto module 140 may be configured to judiciously alter the data signals the IPM 128 receives through the communication bridge 152 or the internal IPM decoupler 136, for example by adding or removing certain packet header information or suppressing certain data fields.

In one embodiment, when a tampering event is detected by a tamper-detecting sensor 120, the ZSLs 322 external to the IPM 128 cooperate with the ZSL 316 internal to the IPM 128 to zeroize the information stored in a IPM memory module 312. The zeroization method employed may be novel or existing, such as disclosed in U.S. Pat. No. 4,860,351 A ("Tamper-resistant packaging for protection of information stored in electronic circuitry") in which electrical current is distributed through a coil or coils, or in U.S. Pat. No. 3,882,324 A which describes a method and apparatus for combustibly destroying microelectronic circuit board interconnections. Ignition of the self-destruct interconnections may be achieved by enclosing the circuit board in a box which also mounts a sheet of pyrofuse foil. Enclosed metallized connections may be directly exposed to the foil so that, when the foil is ignited, the high heat of its thermite reaction ignites the self-destruct film interconnections. The violent reaction of the foil may also produce a sputtering of high temperature metal particles that strike the metallized interconnections at various points to positively assure ignition and the desired destruction of these interconnections.

In one embodiment, materials such as Indium NanoFoil® may be re-purposed to act as the energy source for the destructive zeroization.

In one embodiment, the anti-tamper system 80 may comprise at least one reset module 109 configured to restore the system to an initial pre-used state. The reset module 109 may be configured for use by external parties.

For purposes of this disclosure, the term "state" comprises the totality of the information stored in the system's 80 components, including, but not limited to, its firmware, loaded code, memory, CPU data, caches, and overall internal hardware configuration. "State" further comprises any additional information that helps to completely describe the system 80 at a particular time, including information related to its network state, firewall rules, uptime, usage, and identity of parties that have accessed the system in the past in any capacity.

The reset module 109 may include a power reset pin configured to perform a complete power-cycle of the system 80. The power reset pin may be accessed physically, electrically, or by other means. The power reset pin may be a switch configured to be turned on and off. In one embodiment, the power reset pin may be configured for use by external parties to power-cycle the enclosure. This may result in the system 80 resetting to a secure initial state—as may be defined in a security policy describing the system, e.g., such as required by NIST FIPS certification—with all information related to use of the anti-tamper system 80 prior to the power-cycle being zeroized.

In one embodiment, use of the reset module 109 or power-cycling does not zeroize all internal information. For example, vendor-related certificates or other cryptographic materials and keys unrelated to the system 80 use just prior to the power-cycle may be preserved.

In one embodiment, the system 80 provides separate means to reset certain state within the cryptographic module 140 only and not zeroize all internal information. For example, vendor-related certificates or other cryptographic materials and keys unrelated to the system 80 use just prior to the power-cycle may be preserved.

One skilled in the art would recognize various additional means of resetting the system 80, all of which are contemplated by the present invention. Multiple different types of reset modules 109 may be provided, each type resulting in a different system state after reset. For example, in addition to a power cycle reset, a certain "software reset" type may be provided in which, e.g., software loaded onto the IPM 128 may be restarted without any additional information being zeroized.

In one embodiment, the power delivery circuitry comprised by the internal power connector 116 or Internal IPM Decoupler 136 may interact with the crypto module 140 so as to ensure that a reset of the crypto module is not possible without a complete power cycling of the IPM 128 for a minimum amount of time. A possible design comprises a time-delay relay circuit controlled by the crypto module 140 or a drop in its input voltage—once powered off, the time-delay relay ensures that a given amount of time passes before power to the IPM 128 is restored.

This defends against attacks aiming to reset the crypto module 140 without also power-cycling the IPM 128, which is often undesirable when the crypto module 140 is used to keep track of the state of the IPM 128. By ensuring a time delay before turning power back on, the system guarantees a full reset of the IPM 128 internal state back to an initial state.

In one embodiment, the anti-tamper system 80 may comprise a control panel 160 configured to provide a communication link for components internal to the system to communicate with external parties, including communications from external parties to components internal to the system. The control panel 160 may be configured to connect with one or more system 80 components, including the crypto module 140 and the communication bridge 152. The control panel 160 may comprise LEDs or other display technologies.

In one embodiment, the control panel 160 may be configured to convey certification-related information to external parties. For example, the control panel may be used as an indicator of whether the system is in a FIPS "approved mode of operation" as mandated by FIPS Publication 140 security requirements.

In one embodiment, the control panel 160 may convey information to external parties from the crypto module 140, the IPM 128, the Internal IPM Decoupler 136, or any other component of the system 80. The crypto module 140 may signal a successful completion of a verification protocol with third parties 416 with the goal of proving that the enclosure has been manufactured by a trusted vendor and that no tampering has been detected yet. Such a third party in this context will also be referred to throughout this disclosure as a verifier. The IPM 128 or the Internal IPM Decoupler 136 may signal a successful power-up and connection of the IPM 128 through the Internal IPM Decoupler 136 and the internal power connector 116.

In one embodiment, any of the following components may be situated within, or structurally linked to, any other such component, or both: the control panel 160, the communication port 156, the reset module 109, the power connector 108, and the battery connection socket 100.

In one embodiment, the crypto module 140 may use the communication bridge 152 to communicate with third parties 416 through an external communication port 156 or control panel 160, in the process of enforcing security assurances of the anti-tamper system 80. For example, the crypto module 140 may engage in a verification protocol with third parties 416 in an attempt to prove that the system 80 has been manufactured by a trusted vendor and that no tampering has been detected yet. To this end, the crypto module 140 may also communicate with the IPM 128 using the communication bridge 152, the communication conduit 132, and the Internal IPM Decoupler 136.

In an alternate embodiment, the IPM 128 may engage in said verification protocol and communicate with third parties 416 using the communication bridge 152, the communication conduit 132, and the Internal IPM Decoupler 136. The IPM 128 may also request the aid of the crypto module 140 through the communication bridge 152, the communication conduit 132, and the Internal IPM Decoupler 136.

As discussed above, the core tamper-respondent assurances of an anti-tamper system comprise the abilities to prove to outside parties that the system 80 is produced by a trusted vendor, and that the system has not been tampered with. This process is referred to herein as verification. A system 80 that has been tampered with may be incapable of claiming that it has not been tampered with.

Figure 4:
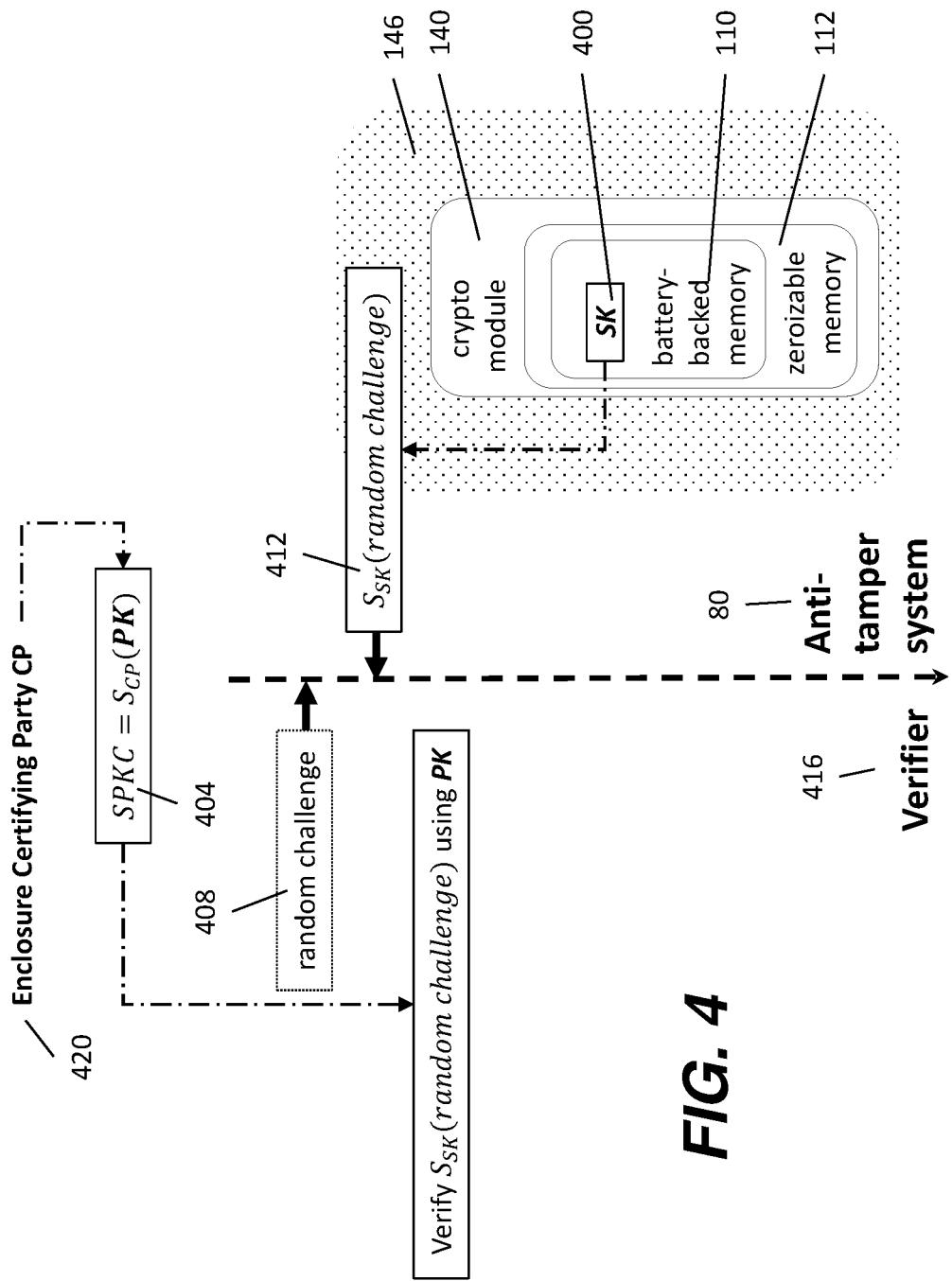
FIG. 4 is a functional block diagram illustrating the operation of an embodiment of the present invention.
Figure 5:
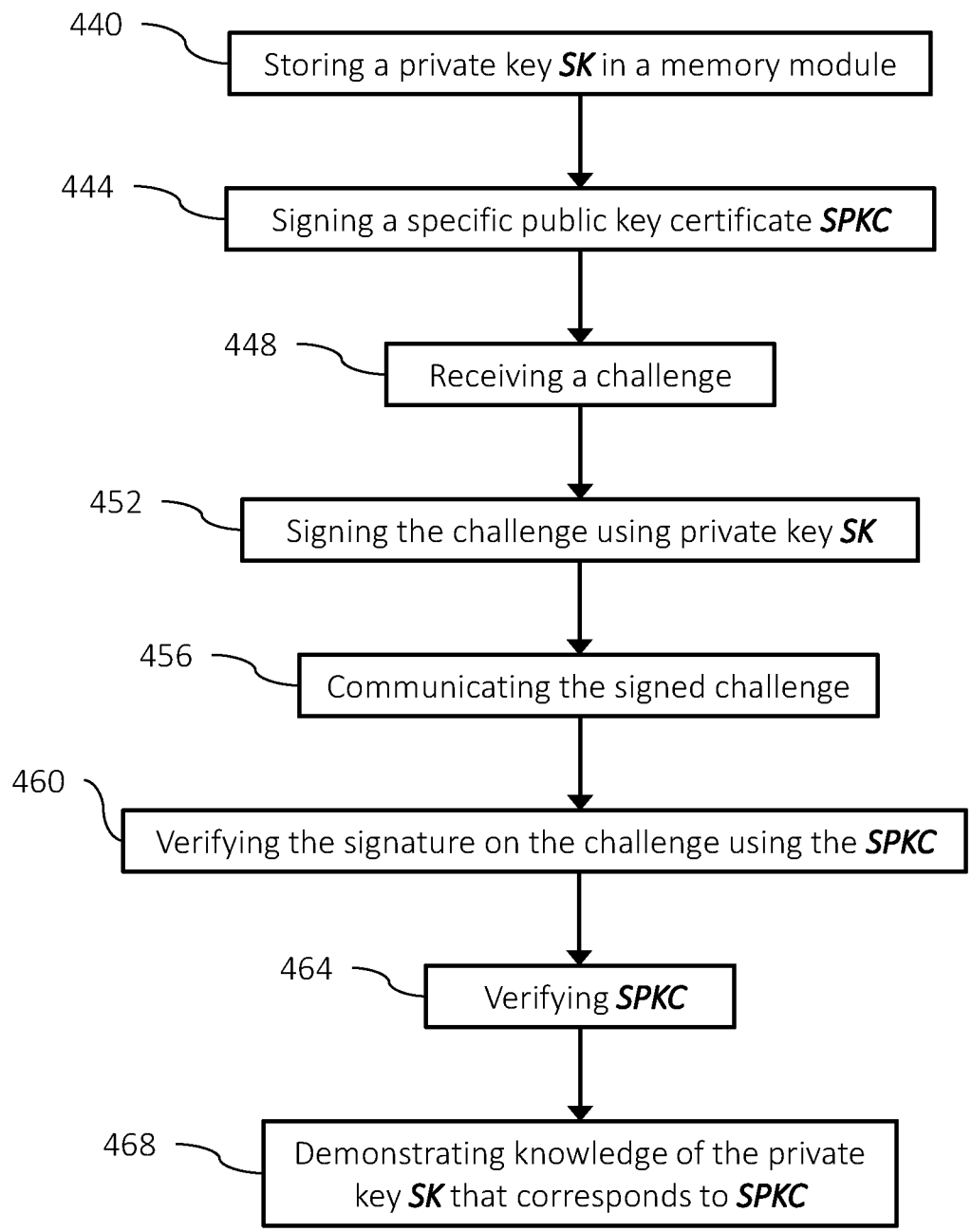
FIG. 5 is a flow diagram illustrating a verification process according to one embodiment of the present invention.

FIG. 4 is a schematic diagram that illustrates the interaction between the system 80, an enclosure Certifying Party 420, and a verifier 416. FIG. 5 is a flow diagram depicting one embodiment of a verification process using system 80. As with any of the drawings in this disclosure, not all elements or process steps included in the embodiments illustrated are necessary to the invention, and the invention does not necessarily require any process steps to be performed in the order described. One skilled in the art provided with this disclosure would appreciate various means for performing this verification process beyond the examples of preferred embodiments described.

Referring now to FIG. 4, an anti-tamper enclosure system 80 may convince third parties 416 that it has not been tampered with by storing a key SK 400 internally in a zeroizable memory module 112, as shown in step 440 of FIG. 5, and later demonstrating knowledge of SK 400, as shown in step 468 of FIG. 5, thus showing that SK 400 has not been zeroized yet.

Further, by providing a design in which SK 400 can be shown to be "endorsed" by or linked to a specific certifying party (CP) 420, such as a vendor, proving knowledge of SK 400 may also provide assurances to a third party 416 that the enclosure system 80 has been produced or endorsed by said certifying party 420. The certifying party 420 may be any party that can certify or verify that the producer or source of the system 80 can be trusted for a given deployment of the system 80. Examples of a potential CP include a vendor or the manufacturer.

In one embodiment, this may be achieved by having said certifying party CP 420 sign a specific public key certificate (SPKC) 404, as shown in step 444 of FIG. 5. SK 400 may then be an asymmetric encryption algorithm private key (SK) 400 corresponding to a public key (PK) 512 associated with the specific public key certificate (SPKC) 404.

Asymmetric cryptography, also known as public-key cryptography, is a class of cryptographic algorithms that requires two separate keys, one of which is secret (or private) and one of which is public. Although different, the two parts of this key pair are mathematically linked. The public key is used to encrypt plaintext or to verify a digital signature, whereas the private key is used to decrypt ciphertext or to create a digital signature. The term "asymmetric" stems from the use of different keys to perform these opposite functions, each being the inverse of the other. This can be contrasted with conventional ("symmetric") cryptography, which relies on the same key to perform both functions.

For purposes of this disclosure, an asymmetric decryption key is referred to as "private" and its corresponding encryption key is referred to as "public." Examples of asymmetric encryption algorithms include RSA, DSS, ElGamal, various elliptic curve techniques, the Paillier cryptosystem, and the Cramer-Shoup cryptosystem.

An electronic signature 412 refers to any electronic means that indicates either that a "signer" adopts the contents of an electronic message, or more broadly, that the signer who claims to have written a message is the one who wrote it (and that the message received is the one that was sent by this signer).

A digital signature 412 (also called a "cryptographic signature") is a mathematical scheme for demonstrating the authenticity of a digital message or document, and is often part of a larger electronic signature system. A valid digital signature gives a recipient reason to believe that the message was created by a known sender (authentication), such that the sender cannot deny having sent the message (non-repudiation), and that the message was not altered in transit (integrity). Digital signatures are commonly used for software distribution, financial transactions, and in other cases where it is important to detect forgery or tampering.

For purposes of this disclosure, $S_{SK}(x)$ denotes the electronic signature 412 of message x by a signer uniquely identified by identifier SK. In the case of a digital signature, SK may represent a private key of the signer in a public/private key cryptographic system. A party with access to the corresponding public key of the signer may verify the signature. For simplicity, the notation $S_{SK}(x)$ implies that a party may also extract the actual message x from $S_{SK}(x)$.

In the cryptography field, a public key certificate (also known as a digital certificate or identity certificate) is an electronic document used to prove ownership of a public key. The certificate includes information about the key, information about its owner's identity, and the digital signature of an entity that has verified the certificate's contents are correct. If a valid signature is provided, and the person examining the certificate trusts the signer, then such person is assured that the key can be used to communicate with its owner.

In a typical public-key infrastructure scheme, the signer is a certificate authority, usually a company, such as Symantec/Verisign, Comodo, GoDaddy, and GlobalSign, that may charge a customer for issuing it a certificate. In a web of trust scheme, the signer is either the key's owner (which creates a self-signed certificate) or other users (providing for "endorsements") whom the person examining the certificate might know and trust. Public key certificates may come in numerous formats, such as the X.509 public key certificate format.

In one embodiment, the SPKC certificate 404 conveys the intention of a certifying party CP 420 to associate the private key SK 400 with the corresponding anti-tamper enclosure 80. In one embodiment, by certifying an enclosure 80, the CP 420 may express the fact that the enclosure 80 satisfies a minimal set of expected security properties and operational requirements. These properties and requirements may be comprised by the public key certificate or otherwise made available for perusal of interested parties, such as in a publicly available FIPS security policy, which may be published online. An anti-tamper enclosure 80 is said to be "certified" by a certifying party (CP) 420 if it comprises a private key SK 400 for which said CP 420 has signed a public key certificate SPKC 404.

In one embodiment, an anti-tamper enclosure 80 may prove to a verifier 416 that it is certified by said CP 420 by, as shown in step 468 of FIG. 5, demonstrating knowledge of the private key SK 400 corresponding to the public key certificate SPKC 404 signed by CP 420. In one embodiment, this may be achieved by having the crypto module 140 or other internal components prove knowledge of the private key SK 400 to said verifier 416.

To this end, in an embodiment, a "challenge" 408, which is a type of electronic message, may be generated, such as by said verifier 416. This challenge 408 may be communicated to the system 80, and the system may then receive this challenge, as shown in step 448 of FIG. 5. The system 80, by means of the crypto module 140 or other internal components, may sign the challenge 408 using SK 400, as shown in step 452 of FIG. 5. This enables the signature 412 to be verified, i.e., validated, using the SPKC certificate 404 corresponding to SK 400, as shown in step 460 of FIG. 5. In step 464, which may be performed by the verifier 416, the SPKC 404 may be verified using CP's 420 own public key certificate which may be trusted by the verifier 416. Additionally or alternately, the CP's 420 own public key certificate may be in turn signed by an authority trusted by the verifier 416 in a "cross-certification" chain, as typically employed in existing public key cryptography systems. The system 80 may then demonstrate knowledge of the private key SK 400 that corresponds to the specific public key certificate SPKC 404, as shown in step 468 of FIG. 5. In one embodiment, the SPKC certificate 404 may be stored within the anti-tamper enclosure 80 and provided to the verifier 416 during verification.

Figure 6:
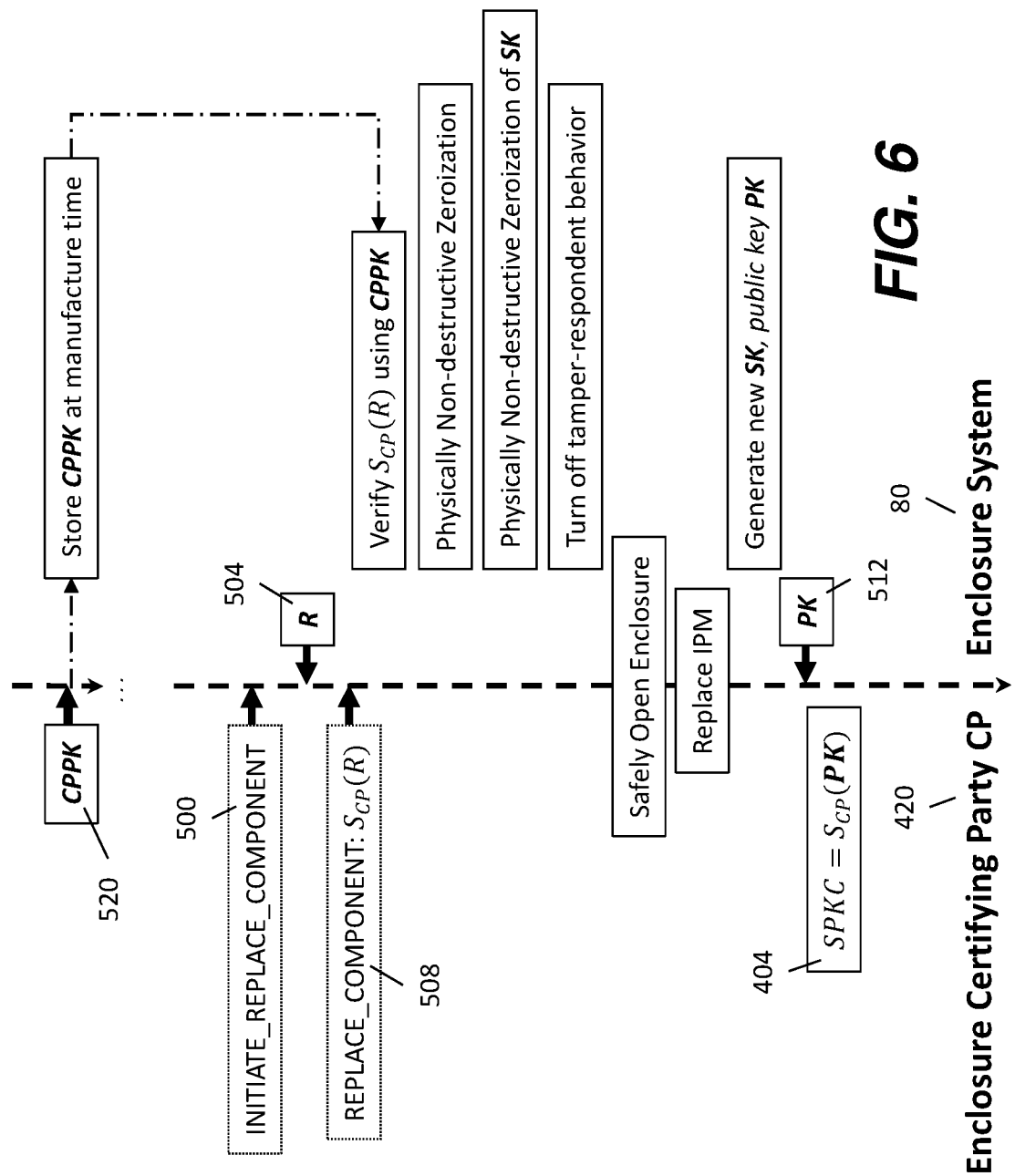
FIG. 6 is a functional block diagram illustrating the operation of another embodiment of the present invention.
Figure 7:
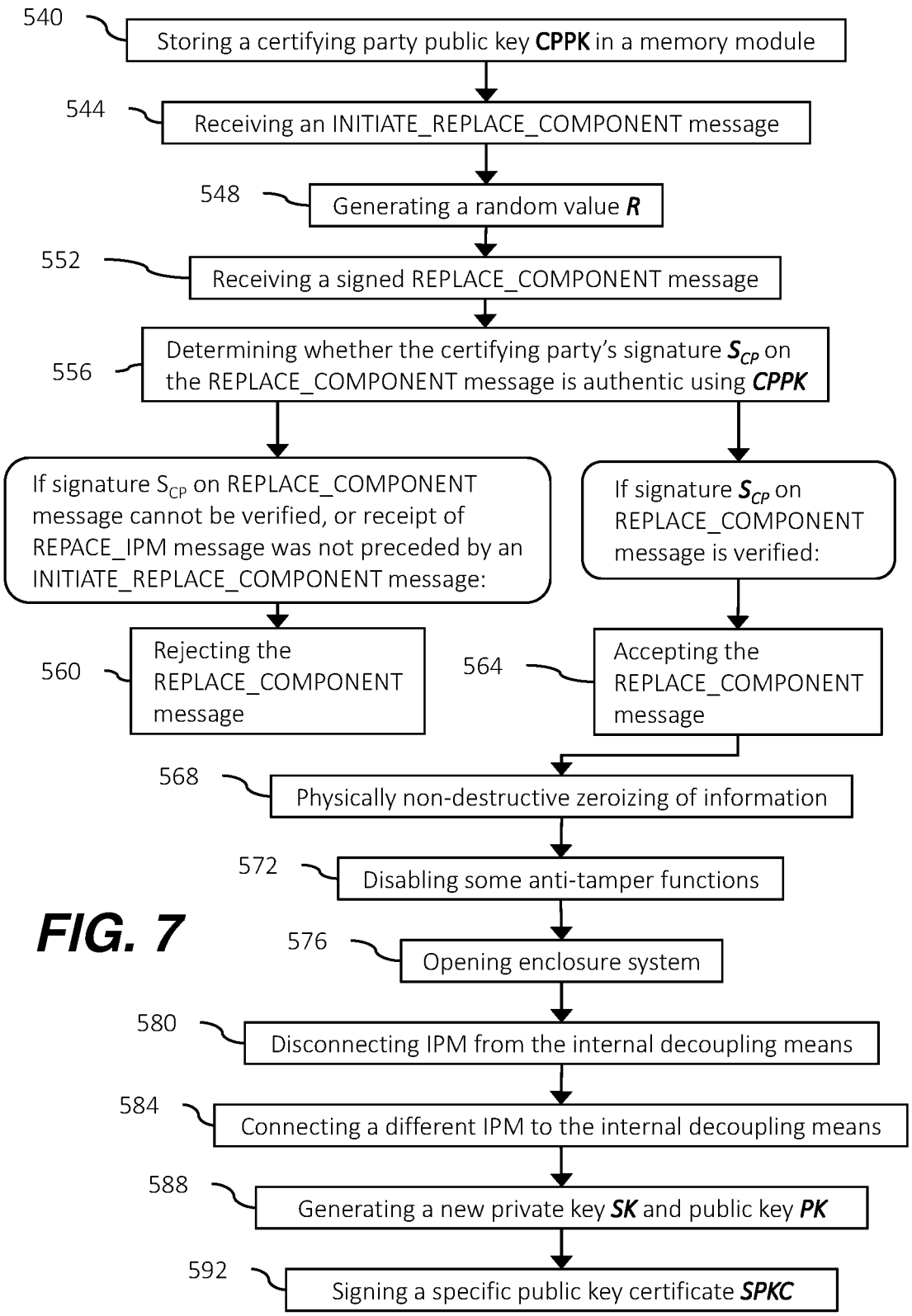
FIG. 7 is a flow diagram illustrating a process of replacing internal circuitry according to one embodiment of the present invention.

FIG. 6 is a schematic diagram that illustrates the interaction between the system 80 and an enclosure Certifying Party 420. FIG. 7 is a flow diagram depicting one embodiment of a process of replacing the IPM 128. As with any of the drawings in this disclosure, not all elements or process steps included in the embodiments illustrated are necessary to the invention, and the invention does not necessarily require any process steps to be performed in the order described. One skilled in the art provided with this disclosure would appreciate various means for performing this IPM replacement process beyond the examples of preferred embodiments described, and also appreciate that these teachings are applicable to the replacement of interchange of any system component or internal circuitry; not merely the IPM 128. For clarity, the interchange of electronic components is described with respect to the IPM 128.

In a preferred embodiment as illustrated in FIG. 6, the anti-tamper system 80 may be configured such that the IPM 128 (or other component enclosed by at least one enclosing layer 162) may be replaced in a manner such that the anti-tamper system possesses a specified set of security properties both before and after such interchange of electronic components. For example, this specified set of security properties may be the National Institute of Standards and Technology Federal Information Processing Standard Publication 140-2 Security Level 1, Level 2, Level 3, or Level 4; the security standards defined by the United States Department of Defense Anti-Tamper Executive Agent or Physical Security Equipment Guide; or other existing standards that define sets of security properties. As explained above, the specified set of security properties referred to throughout this disclosure's description and claims may comprise the security requirements defined by any security level of any version of the FIPS Publication 140 standard. When referring to the FIPS Publication 140 standard in the claims of this disclosure, such references are to be understood to encompass any version of the standard and such references are not to be interpreted as limiting such claims' application to any particular version of the FIPS Publication 140 standard.

In a preferred embodiment, the system 80 is configured such that this interchange of the IPM 128 does not interfere with the system's security properties or certification. For example, if the system 80 initially possessed the security properties defined by FIPS Publication 140 Security Level 4, the system ideally would possess FIPS Publication 140 Security Level 4 properties after interchanging the IPM 128 as described herein. Ideally, this enables the system's security certification to remain in place after interchanging the IPM without any need for recertification.

The system's 80 purpose is to provide a physically secure enclosure to the IPM 128. The system provides provable, on-demand guarantees to the IPM that it is located within a physically secure enclosure with a given security level (e.g., FIPS 140 Level 4). A physical tamper event on the enclosure may zeroize CSPs and render the system and the IPM 128 inoperable.

Along with physical security guarantees, the system 80 provides certain services to the IPM 128. Customer applications making use of the IPM 128 and the system 80 therefore receive the benefit of provable execution within a physically secure enclosure. Any application-sensitive information generated within the IPM benefits from the physical protection offered by the enclosure. In the event of illicit physical access, the IPM may be rendered inoperable.

In one embodiment, the system operates under a FIPS security policy that considers the IPM 128 as a security-excluded element, which means the security policy applies to other system components, excluding the IPM 128. The system 80 is designed so as to ensure that its FIPS-defined security properties are not impacted by the IPM 128. This is vastly different from all existing FIPS 140 Level 4 devices and renders it far superior to existing designs in the prior art.

In one embodiment, the key security component within the system is the crypto module 140, in accordance with the system's security policy. All CSPs are generated and stored within the crypto module 140. The crypto module also provides CSP zeroization as a tamper response.

In one embodiment, the system's security policy (e.g., FIPS security policy) services are provided by the crypto module and are accessible only to the IPM 128 over an internal physical USB connection. The IPM is not a security-providing component, but a consumer of services that the system provides. The IPM can thus be excluded from the policy. This design categorically distinguishes the present invention from all existing anti-tamper enclosures in the prior art, which designs necessitate the IPM to be included in such enclosures' security policies.

In another embodiment, the system 80 may be configured to possess a higher level of security prior to the interchange of the IPM 128. In this case, it is the lower level of security properties that was possessed both before and after the interchange, as a given level of security typically encompasses the security properties included in any lower level of security. For example, it may be desirable that the system 80 be configured to possess FIPS Publication 140 Security Level 3 properties both before and after any interchange of the IPM 128. In such an example, the system 80 may initially also possess Security Level 4 properties prior to the interchange. Ideally, this enables the system 80 to maintain a FIPS Publication 140 Security Level 3 certification both before and after the interchange of the IPM without any need for recertification.

Alternatively, the system 80 may be configured to receive a "two-layer certification." In this embodiment, the system 80 is configured to be certified for a particular initial security level, and additionally certified in advance for some lower security level where such "lower" security certification takes effect after any interchange of components described herein without any need for recertification. For example, the system 80 may be certified such that it maintains a FIPS Publication 140 Security Level 4 certification up until any interchange of components, and thereafter maintains a FIPS Publication 140 Security Level 3 certification without requiring recertification.

This interchange of the IPM 128 may be achieved by communicating an electronic message called a REPLACE_COMPONENT message 508 to the enclosure 80. In a preferred embodiment, such communication is initiated by an external party, such as a certifying party 420.

The control panel 160, external communication port 156, or another element of the system 80 may be configured to receive this or other electronic messages. In one embodiment, after receiving a REPLACE_COMPONENT message 508 as shown in step 552 of FIG. 7, the enclosure system 80 may zeroize stored information in a physically non-destructive manner as shown in step 568 of FIG. 7. The system 80 may be configured to trigger and perform such zeroization automatically in response to receipt of a REPLACE_COMPONENT message 508.

In an alternate embodiment, after receiving a REPLACE_COMPONENT message 508 in step 552 of FIG. 7, the enclosure system 80 may instead zeroize stored information in a physically destructive manner. The system 80 may be configured to trigger and perform such zeroization automatically in response to receipt of a REPLACE_COMPONENT message 508.

The anti-tamper system 80 may include ZSL for both physically destructive and non-destructive zeroization, and be configured to provide the external party 420 with a selection as to which type of zeroization the system 80 will perform.

In an embodiment, the stored information that is zeroized in a physically non-destructive manner in step 568 may comprise information associated with proving that the enclosure 80 has been certified by a certifying party; that the enclosure 80 was produced by a trusted vendor; that the enclosure 80 has not been tampered with; or any combination thereof. Such information may include, for example, key SK 400. Such information may be required to be stored in the enclosure 80 prior to sealing the enclosure. For example, as discussed above, this may require internally storing a key SK 400 that is "endorsed" by or linked to a specific certifying party (CP) 420, such as a vendor. SK 400 may be an asymmetric encryption algorithm private key (SK) 400 for which there exists a corresponding public key certificate (SPKC) 404 signed by said certifying party CP 420.

In one embodiment, the system's 80 "cryptographic boundary" is an inner metal box. The inner metal box is completely enveloped by a tamper-sensitive membrane. Any attempt to gain access to components within the cryptographic boundary by physical tamper of the membrane is detected by the tamper-detecting sensors. Once physical tampering is detected by the sensors, the zeroization support logic immediately triggers the zeroization of CSPs.

In one embodiment, the system 80 monitors various tamper-sensitive membrane characteristics, including electrical resistance, signal distortion properties, and the like. The monitoring process may comprise alternating between short periods of measurement of different characteristics. For example, resistance may be measured for 5 milliseconds, followed by 10 milliseconds of sending and measuring the return of a signal through electrical conduits comprised by the membrane.

In one embodiment, in addition to a tamper-sensitive membrane, the system 80 also provides environmental failure protection (EFP) features. If environmental condition values, such as the operating temperature or battery voltage, vary outside of normal operating ranges, tamper response is triggered. EFP features are provided by the crypto module 140.

In one embodiment, the system 80 uses the zeroization capability of the crypto module 140. The CSPs are stored in the crypto module's battery-backed memory 110. In the case of a tamper event, the battery-backed memory 110 is zeroized, rendering CSPs inaccessible and the power to the crypto module and IPM 128 is cut.

In an embodiment, the enclosure system 80 may be configured to, after receiving a REPLACE_COMPONENT message 508 in step 552, return to a raw, in-factory state with no vendor identifying information stored within. The system 80 may be configured to trigger and perform such actions automatically in response to receipt of a REPLACE_COMPONENT message 508.

In an embodiment, the enclosure 80 may be configured to temporarily disable some (or all) of its tamper-respondent or other anti-tamper functions after receipt of a REPLACE_COMPONENT message 508, as shown in step 572 of FIG. 7. This may allow for physical access to components within enclosure 80, such as for enabling a manufacturer or other external party 420 to open the enclosure 80, as shown in step 576 of FIG. 7. This, in turn, may enable the IPM 128 or other circuitry to be replaced in a manner that does not interfere with the security properties or certification of the system 80. Replacing internal circuitry may comprise disconnecting a component from the Internal IPM Decoupler 136, as shown in step 580 of FIG. 7, and connecting a replacement component in its place, as shown in step 584. The system 80 may be configured to trigger and perform the disabling of anti-tamper functions automatically in response to receipt of a REPLACE_COMPONENT message 508.

In an embodiment, the system's 80 acceptance of any REPLACE_COMPONENT message as shown in step 564 of FIG. 7, or triggering of any zeroization after receipt of such message as shown in step 568, may be conditional on prior authentication of the message's sender as shown in FIGS. 6 and 7. This may be achieved by means for enabling or requiring a trusted party 420, such as the manufacturer of the system, to sign the REPLACE_COMPONENT message 508.

Further, the enclosure system 80 may be configured to determine whether the signature of the trusted party can be verified using information previously stored. For example, with regard to asymmetric cryptography, the enclosure system 80 may store the certifying party 420 (e.g., manufacturer) public key (CPPK) 520 at production time, as shown in step 540 of FIG. 7. Then, after receiving a REPLACE_COMPONENT message 508, as shown in step 544, CPPK 520 can then be used to authenticate a manufacturer signature, such as the certifying party's signature $S_{CP}$ on a REPLACE_COMPONENT message 508, as shown in step 556 of FIG. 7. If the signature $S_{CP}$ cannot be verified, the system 80 may reject the REPLACE_COMPONENT message 508, as shown in step 560.

In one embodiment, the REPLACE_COMPONENT message 508 may comprise a large (e.g., 256 bits) random value R 504 which the system 80 is configured to generate, as in step 548 of FIG. 7, in response to its receipt of an electronic message called an INITIATE_REPLACE_COMPONENT message 500, as in step 544. The system 80 may be configured to reject any REPLACE_COMPONENT message 508 that is not preceded by an INITIATE_REPLACE_COMPONENT message 500 or that does not contain the correct R 504 value generated, as shown in step 560. The system 80 may be configured to zeroize upon such rejection in step 560. The purpose of value R 504 includes directly associating a REPLACE_COMPONENT message 508 with the INITIATE_REPLACE_COMPONENT message 500, which may aid in preventing an unauthorized party from replaying or reusing a REPLACE_COMPONENT message 508.

In one embodiment, the value R 504 may be signed by the trusted party 420. In this case, the purpose of R may also include aiding the trusted party 420 in proving its identify to the system 80.

The system 80 may be further configured to generate a new private key SK and public key PK, as shown in step 588 of FIG. 7, once the IPM 128 has been replaced in steps 580 and 584. The certifying party 420 may then sign a new specific public key certificate SPKC 404, as shown in step 592.

The above-described properties may provide an anti-tamper system 80 configured to enable an IPM 128 or other circuitry may be replaced or changed such that the system provides a specified set of security properties both before and after such IPM interchange.

For clarity and efficiency, this disclosure provides various descriptions relating to decoupling, installation, removal, replacement, and changing of an IPM 128, and the apparatus and processes for providing such functionality. While such descriptions of the invention were often made throughout this disclosure with reference to an IPM 128, it is to be understood, that such descriptions may additionally or alternatively apply to a crypto module 140, or any other components of the system's 80 CPC that are capable of being both physically and logically decoupled from the system. Ideally, such components are not required by the security certification process to be an intrinsic part of the system, or they can be installed, removed, replaced, changed, or decoupled without affecting the security certification status. The present invention fully contemplates all necessary apparatus and methods to provide an anti-tamper system 80 in which all such descriptions of decoupling, installing, removing, replacing, and changing an electronic component apply to a crypto module 140. For instance, the Internal IPM Decoupler 136, while referred to as an Internal IPM Decoupler for clarity of this disclosure, may be configured to connect to, such that the anti-tamper system 80 may utilize the functionality of, a cryptography module 140 instead of an IPM 128.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An anti-tamper system, comprising:
   an anti-tamper enclosure having at least one enclosing layer;
   at least one tamper-detecting sensor configured to detect tampering with the anti-tamper system;
   zeroization support logic connected to at least one tamper-detecting sensor, configured for zeroization of data stored in the anti-tamper system in response to tampering detected by at least one tamper-detecting sensor;
   at least one memory module enclosed by at least one enclosing layer, configured to store information;
   at least one decoupling interface enclosed by the at least one enclosing layer, wherein the at least one tamper-detecting sensor, the zeroization support logic, and decoupling interface are integrated as an anti-tamper system component and the decoupling interface is configured to selectively provide a physical and logical connection between the anti-tamper system component and at least one electronic component that has been enclosed by at least one enclosing layer;
   wherein:
   said anti-tamper enclosure includes at least one discrete electronic component enclosed by the at least one enclosing layer;
   said at least one discrete electronic component is connected to said at least one decoupling interface so as to be physically and logically linked to the anti-tamper system component; and
   the anti-tamper system component is further configured to maintain its security properties independent of the identity of the at least one discrete electronic component.

2. An anti-tamper system according to claim 1, further comprising an internal module configured for controlling the electrical signals pertaining to at least one discrete electronic component enclosed by the at least one enclosing layer and other internal components, wherein said internal module is enclosed by the enclosing layer.

3. An anti-tamper system according to claim 2, wherein the anti-tamper system component further comprises the internal module integrated with the at least one tamper-detecting sensor, the zeroization support logic, and the decoupling interface.

4. An anti-tamper system according to claim 3, wherein said internal module defines a cryptography module configured for performing cryptographic functions.

5. An anti-tamper system according to claim 4, further configured for operation in accordance with:
   a security policy that defines the anti-tamper system's security properties independent of the at least one electronic component that the at least one decoupling interface is configured to link to the anti-tamper system, wherein the anti-tamper system component performs the anti-tamper and cryptographic functions needed to enforce the security policy.

6. An anti-tamper system according to claim 5, further configured to enable the electronic component that the at least one decoupling interface is configured to link to the anti-tamper system to assume an authorized role as defined in said security policy or the security policy's associated security standard.

7. An anti-tamper system according to claim 2, further configured to at least one of reset and power cycle the at least one electronic component that has been enclosed by the enclosing layer and electrically connected to the at least one decoupling interface, upon at least one of tamper detection and instruction from the internal module, so as to zeroize and restore to an initial state said electronic component.

8. An anti-tamper system according to claim 1, wherein the zeroization support logic is further configured to zeroize at least one element of the anti-tamper system, and further configured to zeroize at least one component enclosed by the enclosing layer and electrically connected to the at least one decoupling interface.

9. An anti-tamper system according to claim 1, wherein:
said anti-tamper enclosure includes at least one discrete electronic component enclosed by the at least one enclosing layer;
said at least one discrete electronic component is connected to said at least one decoupling interface so as to be physically and logically linked to the anti-tamper system component; and
the anti-tamper system component is further configured to maintain its security properties independent of a connection status of the at least one discrete electronic component relative to the at least one decoupling interface.

10. An anti-tamper system according to claim 1, wherein at least one memory module is a zeroizable memory module.

11. An anti-tamper system according to claim 1, wherein at least one memory module is a battery-backed memory module.

12. An anti-tamper system according to claim 1, wherein said anti-tamper enclosure includes at least one discrete electronic component enclosed by the at least one enclosing layer and the at least one discrete electronic component is an information processing module configured for providing an information processing functionality to the anti-tamper system.

13. An anti-tamper system according to claim 12, configured to implement the information processing functionality of various types of information processing modules through connection with the at least one decoupling interface, and further configured to provide a specified set of security properties irrespective of the type of information processing module that the anti-tamper system is configured to implement the functionality of.

14. An anti-tamper system according to claim 12, wherein said at least one decoupling interface is configured to selectively provide the only physical and logical connection between the anti-tamper system component and information processing module.

15. An anti-tamper system according to claim 14, wherein the information processing module comprises at least one communication conduit configured to provide a link for transfer of information between the information processing module and at least one other element of the anti-tamper system.

16. An anti-tamper system according to claim 1, wherein said anti-tamper enclosure includes at least one discrete electronic component enclosed by the at least one enclosing layer and connected to said at least one decoupling interface and the at least one discrete electronic component is a cryptography module configured for performing cryptographic functions.

17. An anti-tamper system according to claim 1, wherein said at least one decoupling interface is configured to selectively provide the only physical and logical connection between the anti-tamper system component and the at least one electronic component that has been also enclosed by at least one enclosing layer.

18. An anti-tamper system according to claim 1, wherein the internal module is configured to monitor and alter the power and data signals used by at least one electrical component enclosed by at least one enclosing layer.

19. An anti-tamper system according to claim 1, wherein the internal module is configured to monitor and alter the electrical signals used by at least one electrical component enclosed by at least one enclosing layer.

20. An anti-tamper system according to claim 1, further comprising at least one layer of encapsulating material enclosed by at least one enclosing layer.

21. An anti-tamper system according to claim 1, further comprising at least one power supply port configured to receive power from a source external to the anti-tamper system.

22. An anti-tamper system according to claim 21, further comprising an internal power connector configured to provide a link between the power supply port and at least one other element of the anti-tamper system.

23. An anti-tamper system according to claim 22, wherein the internal power connector and the at least one decoupling interface form a single element.

24. An anti-tamper system according to claim 1, further comprising at least one reset module configured to restore the anti-tamper system to an initial pre-used state.

25. An anti-tamper system according to claim 1, further comprising at least one communication bridge configured to provide a link for transfer of information between two or more elements of the anti-tamper system.

26. An anti-tamper system according to claim 1, further comprising at least one external communication port configured to provide a link for transfer of information between the anti-tamper system and at least one external device.

27. An anti-tamper system according to claim 1, further comprising at least two different types of tamper-detecting sensors.

28. An anti-tamper system according to claim 1, further comprising at least two different types of zeroization support logic.

29. An anti-tamper system according to claim 1, wherein a private key is stored in a component enclosed by at least one enclosing layer; and wherein:
at least one component enclosed by at least one enclosing layer is further configured for receiving a challenge;
at least one component enclosed by at least one enclosing layer is further configured for signing the challenge, such that the signature is configured to be verified using a specific public key;
at least one component enclosed by at least one enclosing layer is further configured for communicating the challenge that has been signed; and at least one component enclosed by at least one enclosing layer is further configured for demonstrating knowledge of the private key as evidence that the anti-tamper system has not been tampered with.

30. An anti-tamper system according to claim 1, further comprising digital signal processing circuitry connected to at least one other element of the anti-tamper system and enclosed by at least one enclosing layer.

31. An anti-tamper system, comprising:
an anti-tamper enclosure having at least one enclosing layer;
at least one tamper-detecting sensor configured to detect tampering with the anti-tamper system;
zeroization support logic connected to at least one tamper-detecting sensor, configured for zeroization of data stored in the anti-tamper system in response to tampering detected by at least one tamper-detecting sensor;
at least one memory module enclosed by at least one enclosing layer, configured to store information;
at least one decoupling interface enclosed by the at least one enclosing layer, wherein the at least one tamper-detecting sensor, the zeroization support logic, and decoupling interface are integrated as an anti-tamper system component and the decoupling interface is configured to selectively provide a physical and logical connection between the anti-tamper system component and at least one electronic component that has been enclosed by at least one enclosing layer;
at least one discrete electronic component enclosed by the at least one enclosing layer, wherein said at least one discrete electronic component is connected to said at least one decoupling interface so as to be physically and logically connected to the anti-tamper system component;
wherein the anti-tamper system is further configured to, upon receipt of a verified message which disables the tampering detection functionality of the anti-tamper system component, be physically opened for providing access to the at least one discrete electronic component that is enclosed by at least one enclosing layer; and
wherein the decoupling interface is configured to disconnect from said discrete electronic component and connect with and integrate a replacement electronic component such that the anti-tamper system maintains a specified set of security properties both before and after such interchange of electronic components.

32. An anti-tamper system according to claim 31, further comprising an internal module configured for controlling the electrical signals pertaining to at least one discrete electronic component enclosed by the at least one enclosing layer and other internal components, wherein said internal module is enclosed by the enclosing layer.

33. An anti-tamper system according to claim 32, wherein the anti-tamper system component further comprises the internal module integrated with the at least one tamper-detecting sensor, the zeroization support logic, and the decoupling interface.

34. An anti-tamper system according to claim 32, wherein said internal module defines a cryptography module configured for performing cryptographic functions.

35. An anti-tamper system according to claim 31, wherein:
the zeroization support logic is configured to zeroize at least some of the data stored within the anti-tamper system upon fully or partially opening the anti-tamper system;
at least one component enclosed by at least one enclosing layer is further configured for receiving an INITIATE REPLACE COMPONENT message;
at least one component enclosed by at least one enclosing layer is further configured for generating a random value R in response to receipt of the INITIATE REPLACE COMPONENT;
at least one component enclosed by at least one enclosing layer is further configured for receiving a signed REPLACE COMPONENT message; at least one component enclosed by at least one enclosing layer is further configured for verifying the signature associated with the REPLACE COMPONENT message;
at least one component enclosed by at least one enclosing layer is further configured for disabling at least some anti-tamper properties of the anti-tamper system after successful verification of the signature associated with the REPLACE COMPONENT message; and
the anti-tamper system is further configured to maintain its anti-tamper properties during and after unsuccessful verification of the signature associated with the REPLACE COMPONENT message.

36. A method of replacing an electronic component connected to a decoupling interface of an anti-tamper system, comprising the steps of:
providing an anti-tamper system having an enclosure with at least one tamper-detecting sensor, zeroization support logic, at least one memory module, at least one decoupling interface, and a first electronic component which are interconnected and enclosed in an anti-tamper enclosure, wherein said decoupling interface is configured to disconnect from said first electronic component and connect with and integrate a second electronic component such that the anti-tamper system maintains a specified set of security properties both before and after such interchange of electronic components;
wherein an electronic component is directly connected to the decoupling interface and a public key is stored in a component enclosed by at least one enclosing layer;
receiving an INITIATE REPLACE COMPONENT message at the anti-tamper system;
generating a random value R, using a component enclosed by at least one enclosing layer, in response to receipt of the INITIATE REPLACE COMPONENT;
receiving at the anti-tamper system a signed REPLACE COMPONENT message that comprises value R previously generated by the anti-tamper system;
authenticating the signature on the REPLACE COMPONENT message using the public key stored in the anti-tamper system;
zeroizing at least some of the data stored within the anti-tamper system; and
receiving connection to a replacement component and integrating such component into the anti-tamper system using the decoupling interface such that the anti-tamper system maintains a specified set of security properties both before and after such interchange of electronic components.

* * * * *